(12) United States Patent
Noto

(10) Patent No.: US 9,727,164 B2
(45) Date of Patent: Aug. 8, 2017

(54) TOUCH DETECTING CIRCUIT AND SEMICONDUCTOR INTEGRATED CIRCUIT USING THE SAME

(71) Applicant: Synaptics Japan GK, Tokyo (JP)

(72) Inventor: Takayuki Noto, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 121 days.

(21) Appl. No.: 14/607,970

(22) Filed: Jan. 28, 2015

(65) Prior Publication Data

US 2015/0212644 A1   Jul. 30, 2015

(30) Foreign Application Priority Data

Jan. 29, 2014   (JP) ................. 2014-013941

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC  G06F 3/02; G06F 3/041; G06F 3/045; G09G 5/00
See application file for complete search history.

(56) References Cited

U.S. PATENT DOCUMENTS

| 2010/0066692 A1* | 3/2010 | Noguchi | G06F 3/0412 345/173 |
|---|---|---|---|
| 2010/0302183 A1 | 12/2010 | Kogo et al. | |
| 2012/0056835 A1 | 3/2012 | Choo et al. | |
| 2012/0287081 A1* | 11/2012 | Akai | G06F 3/044 345/174 |
| 2012/0313892 A1* | 12/2012 | Philipp | G06F 3/03547 345/174 |
| 2013/0307821 A1 | 11/2013 | Kogo | |

* cited by examiner

*Primary Examiner* — Pegeman Karimi
(74) *Attorney, Agent, or Firm* — Patterson + Sheridan, LLP

(57) ABSTRACT

A touch detecting circuit is allowed to adaptively operate in accordance with an interconnection length to a sensor capacitor of an object to be detected. For example, the touch detecting circuit has a configuration capable of adjusting a threshold value for determination touch and non-touch or a configuration capable of adjusting detection sensitivity of a detection circuit that is connected to the sensor capacitor. For example, the touch detecting circuit has a configuration which includes an adjustment resistor that is connected in series to a signal line for input from the sensor capacitor at an input portion of the detection circuit, and which is capable of performing adjustment to cancel a difference in an interconnection resistance from a sensor capacitor on a far end side to a sensor capacitor on a near end side.

20 Claims, 15 Drawing Sheets

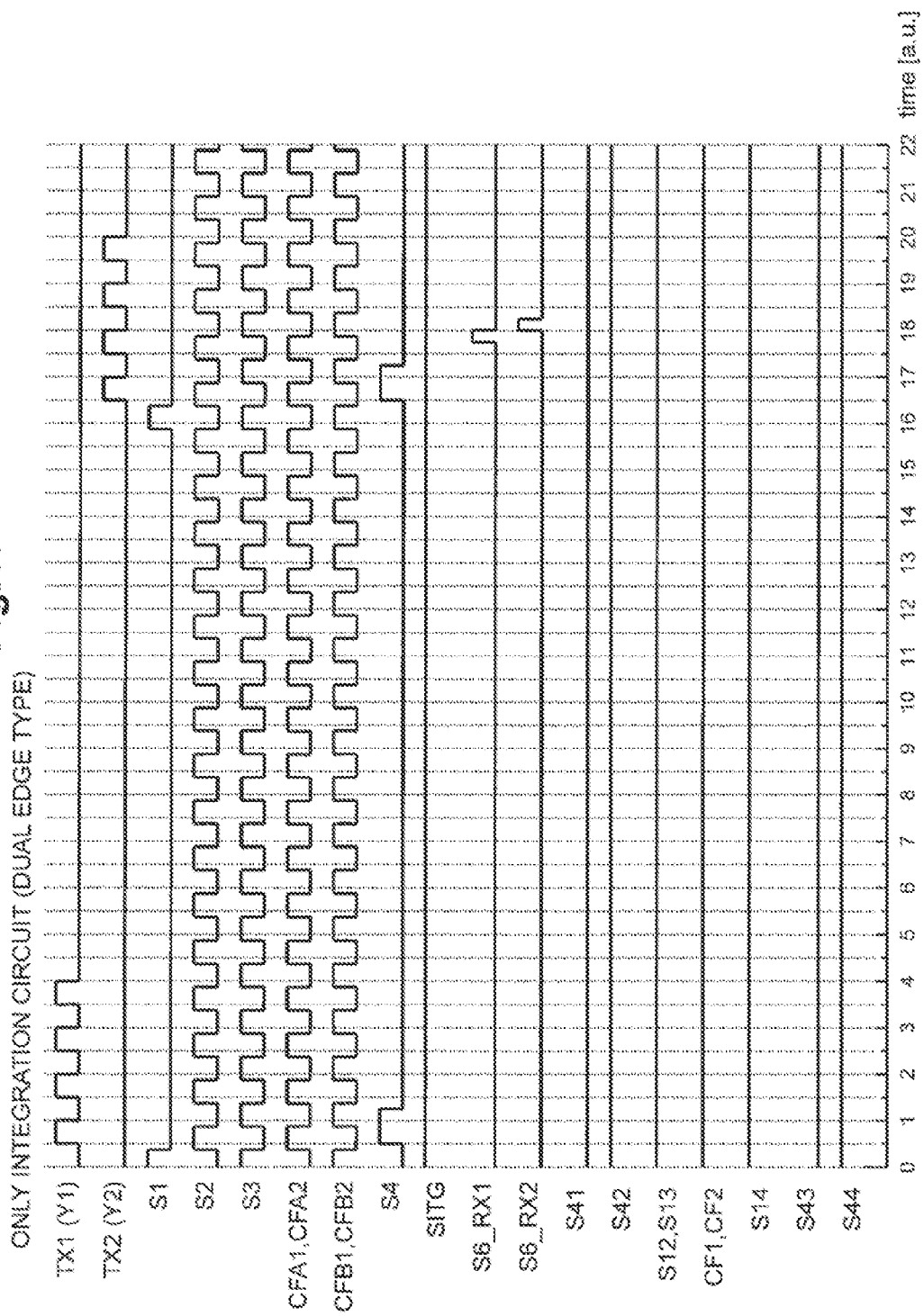

TOUCH DETECTING CIRCUIT AND SEMICONDUCTOR INTEGRATED CIRCUIT USING THE SAME

CROSS-REFERENCE TO RELATED APPLICATIONS

The Present application claims priority from Japanese application JP 2014-013941 filed on Jan. 29, 2014, the contents of which are hereby incorporated by reference into this application.

BACKGROUND

Field of the Disclosure

The present invention relates to a touch detecting circuit and a semiconductor integrated circuit including the same, and particularly to, a touch panel control circuit which can be suitably used as a touch panel control circuit that is connected to a touch panel that is mounted on a display panel so as to overlap therewith.

Description of the Related Art

A touch panel is mounted on a display panel that is used in a smart phone or a tablet terminal so as to overlap the display panel, and a user can operate an apparatus by touching (touching or tracing) a display screen with a finger and the like. To detect a touched position, various types are suggested. For example, in an electrostatic capacitance type, touched coordinates are detected by detecting a variation in an electrostatic capacitance which occurs when a finger or the like approaches sensor capacitors arranged in a matrix shape on a touch panel. The electrostatic capacitance type is classified into a mutual-capacitance type and a self-capacitance type. In the mutual-capacitance type, one side of the electrodes which constitute a sensor capacitor is set as a transmission side, and the other side is set as a reception side, and the mutual-capacitance type uses a phenomenon in which coupling capacitance generated between the transmission side and the reception side decreases due to approaching of a finger and the like. A Y electrode as a drive electrode and an X electrode as a detection electrode are arranged to be perpendicular to each other with a dielectric disposed therebetween, whereby a capacitor (sensor capacitor) is constituted at each intersection. If capacitance due to a finger or a hand is present in the vicinity of the sensor capacitor, mutual capacitance at the intersection is reduced from a capacitance value of the sensor capacitor by a division amount of electric charges that are charged by the capacitance by the finger or the hand. A touch panel control circuit detects the intersection at which a variation of the mutual capacitance occurs and the magnitude thereof. In the self-capacitance type, one electrode of the sensor capacitor is set to a ground potential, and the self-capacitance type uses a phenomenon in which when a finer and the like of the human body that is grounded approaches the sensor capacitor, a capacitive component is added to the sensor capacitor.

In a touch panel control circuit disclosed in JP-A-2012-234474, a pulse-shaped AC drive voltage is repetitively applied to a sensor capacitor from the Y electrode, and electric charges corresponding to a capacitance value of the sensor capacitor at that time are transmitted and are accumulatively added by an integration circuit connected to the X electrode, thereby detecting a capacitance value of the sensor capacitor. At this time, the amplitude of the AC drive voltage that is applied is increased in order to increase the signal level (amount of electric charges that are transmitted), and the timing between signals that drive the display panel is retarded in order to decrease a noise level that is affected by a display drive signal, thereby improving a signal/noise ratio (S/N ratio).

In a display device disclosed in JP-A-2012-59265, a display panel operating period and a touch sensing period are divided in a time division manner, thereby preventing a display drive signal from having an effect on touch detection as a noise.

JP-A-2011-14527 discloses a self-capacitance type touch detecting circuit. Electrodes in an X-direction and electrodes in a Y-direction are arranged in a lattice shape, and a sensor capacitor is formed at each intersection. With respect to a capacitor selected by a combination of the electrodes in the X-direction and the Y-direction, a charging operation and the subsequent discharging operation are performed to detect a variation in an electrostatic capacitance.

JP-A-2013-242699 discloses a touch detecting circuit in combination of the self-capacitance type and the mutual-capacitance type. In a case where multi-touch is detected by the self-capacitance type, detection of touch coordinates is performed by the mutual-capacitance type with a focus on a touched electrode.

SUMMARY

One example provided herein includes a touch panel controller configured to be coupled to a plurality of sensor capacitors arranged on a touch panel through an interconnection. The touch panel controller includes circuit elements. The circuit elements are configured to detect an electrostatic capacitance of a sensor capacitor of the plurality of sensor capacitors. The circuit elements are also configured to vary a detection characteristic corresponding to a sensor electrode associated with the sensor capacitor based on an interconnection length to the sensor electrode to compensate for variation in time constants for different sensor capacitors of the plurality of sensor capacitors.

Another example provided herein includes an input device. The input device includes a touch panel controller configured to be coupled to a plurality of sensor capacitors arranged on a touch panel through an interconnection. The touch panel controller includes circuit elements. The circuit elements are configured to detect an electrostatic capacitance of a sensor capacitor of the plurality of sensor capacitors. The circuit elements are also configured to vary a detection characteristic corresponding to a sensor electrode associated with the sensor capacitor based on an interconnection length to the sensor electrode to compensate for variation in time constants for different sensor capacitors of the plurality of sensor capacitors.

Another example provided herein includes a method. The method includes detecting, through an interconnection to a sensor electrode, an electrostatic capacitance of a sensor capacitor of a plurality of sensor capacitors arranged on a touch panel, the sensor capacitor being associated with a sensor electrode. The method also includes varying a detection characteristic corresponding to a sensor electrode associated with the sensor capacitor based on an interconnection length to the sensor electrode to compensate for variation in time constants for different sensor capacitors of the plurality of sensor capacitors.

BRIEF DESCRIPTION OF THE DRAWINGS

FIG. 17 is a timing chart illustrating a sixth operation mode (only dual edge detection type integration circuit) of the touch detecting circuit of the fifth embodiment.

DETAILED DESCRIPTION

Introduction

Figure 1:
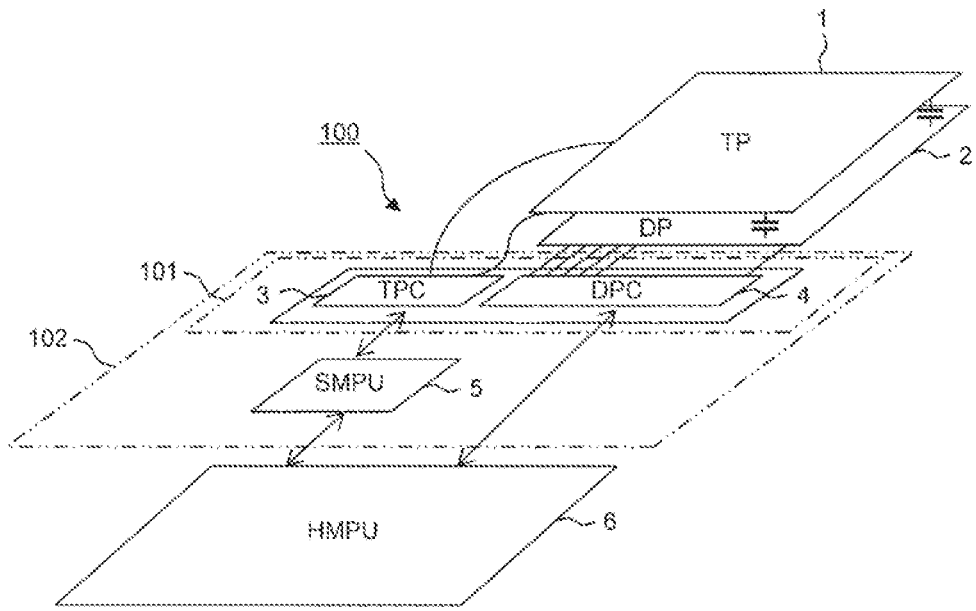
FIG. 1 is a block diagram illustrating an overall configuration of a display and input device that is an example of electronic equipment to which the invention is applied.

With regard to the touch panel control circuit, even though a detection type is different, in the mutual-capacitance type and the self-capacitance type, a variation in a capacitance value of the sensor capacitor and the like is detected, and a determination process such as calculation of the touch coordinates is performed. In any type, a detector connected to the sensor capacitor includes a voltage application circuit that charges the sensor capacitor, and an analog detection circuit to which an analog signal during discharging is input. An analog signal input to the detector is converted into a digital signal, for example, by an analog to digital converter (ADC), and then touch and non-touch are determined by a touch and non-touch detecting logic circuit. A process of determining touch and non-touch detection may be processed with hardware, firmware, and the like. However, in any case, determination of touch and non-touch is performed with an arbitrary threshold value.

At this time, an amount of variation in a capacitance value of the sensor capacitor during touch and non-touch is smaller than the total capacitance value of the sensor capacitor, and thus in the technology of the related art, various kinds of technologies for improving detection sensitivity by suppressing noise have been suggested and employed.

However, the amount of variation in the capacitance value of the sensor capacitor during touch and non-touch is significantly smaller than the total capacitance value of the sensor capacitor. Accordingly, it can be seen that it is difficult to sufficiently improve detection accuracy of touch and non-touch only by suppressing the noise because a difference exists in a resistance value of an interconnection resistance up to the sensor capacitor. That is, the touch detecting type of the related art has no consideration regarding a distance between the sensor capacitor and the detector. However, a touch signal in a sensor capacitor distant from the detector may not be detected due to an increase in size and an increase in accuracy of the touch panel.

In the touch panel, in a case where a plurality of the sensor capacitors are arranged in a matrix shape, an interconnection length to each of the sensor capacitors from the detector is short on a near end side of the detector and is long on a far end side thereof. A difference in the interconnection length is exhibited as a difference in an interconnection resistance in an electrical manner, and as a result, a difference in a time constant (product of resistance and capacitance) occurs between the sensor capacitor on the near end side and the sensor capacitor on the far end side in a case where a signal is transmitted to the detector. The difference in the time constant becomes a difference in an amount of signals that reach the detector, for example, a difference in a voltage or a difference in an amount of electric charges. In addition, with regard to noise that overlaps each of the sensor capacitors, an amount of noise signals transmitted to the detector is attenuated due to the same time constant, and thus a difference occurs between the near end side and the far end side. That is, when ratios of the amount of signals of touch and non-touch and the amount of noise are substantially the same as each other, the sum of the amount of signals (the sum of the amount of signals of touch and non-touch, and the amount of noise) becomes smaller with respect to the sensor capacitor on a far end side. At this time, in the related art, signals from the sensor capacitor on a far end side are attenuated, and thus a difference with a threshold value is small. Thus, the related art has a problem in that the touch signals may not be detected.

Means for solving the above-described problem will be described below, but other problems and new features will become apparent from description of this specification and attached drawings.

An embodiment is as follows.

Specifically, there is provided a touch detecting circuit which is connected to a plurality of sensor capacitors arranged on a touch panel through an interconnection, and which is capable of detecting an electrostatic capacitance of the sensor capacitors. The touch detecting circuit adaptively operates in accordance with an interconnection length to a sensor capacitor that is an object to be detected, by varying a detection characteristic of the sensor capacitor. As used herein, the phrase "sensor capacitor that is an object to be detected" means a sensor capacitor for which capacitive detection is being performed. The detection characteristic may be a threshold value, a resistance value, or a detection sensitivity, as discussed in further detail below.

An effect obtained by the embodiment can be briefly described as follows.

That is, it is possible to perform adjustment to cancel attenuation in an amount of signals in accordance with a distance from the sensor capacitors to the touch detecting circuit, and thus it is possible to stably detect signals transmitted from the sensor capacitors from a far end side to a near end side.

1. Summary of the Embodiments

First, summary of representative embodiments of the invention disclosed in the application will be described. Reference numerals in drawings in parentheses referred to in description of the summary of the representative embodiments just denote components included in the concept of the components to which the reference numerals are designated.

[1] Touch Detecting Circuit Adaptively Operating in Accordance with Distance (Interconnection Length) to Sensor Capacitor A touch detecting circuit according to a representative embodiment disclosed in this application is a touch detecting circuit which is connected to a plurality of sensor capacitors (Cxy) arranged on a touch panel through an interconnection, and which is capable of detecting an electrostatic capacitance of the sensor capacitors. The touch detecting circuit adaptively operates in accordance with an interconnection length to a sensor capacitor that is an object to be detected.

According to this configuration, it is possible to perform adjustment to cancel attenuation in an amount of signals in accordance with a distance from the sensor capacitors to the touch detecting circuit, and thus it is possible to stably detect signals transmitted from the sensor capacitors from a far end side to a near end side.

[2] Adjustment of Detection Threshold Value

The touch detecting circuit according to [1] has a configuration capable of adjusting a threshold value (VT1 to VTm) for determination of whether or not touch occurs in accordance with the interconnection length to the sensor capacitor (Cxy) that is an object to be detected. As used herein, the phrase "determination of whether or not touch occurs" generally refers to the ability to determine whether an input object is present, or not, based on received signals. As used herein, a substitute for that phrase may be "recognizing a touch event."

According to this configuration, with respect to either a large amount of signals from a sensor capacitor on a near end side or a small amount of signals from a sensor capacitor on a far end side, it is possible to determine touch and non-touch by using an appropriate threshold value in each case.

[3] Digital Processing Using Plural Threshold Values

The touch detecting circuit according to [2] includes a circuit that charges the sensor capacitor that is an object to be detected, a detection circuit that detects electrical charges discharged from the sensor capacitor, an AD ("analog-to-digital") conversion circuit that converts an output of the detection circuit into a digital value, and a touch and non-touch detecting circuit that detects touch coordinates on the basis of a plurality of digital values output from the AD conversion circuit in correspondence with the plurality of sensor capacitors. The touch and non-touch detecting circuit (or simply "touch recognition circuit") has a configuration capable of adjusting the threshold value in accordance with the interconnection length to the sensor capacitor that is an objected to be detected.

According to this, in a case of detecting touch coordinates with a digital logic circuit, it is possible to determine touch and non-touch by using an appropriate threshold value in each case.

[4] Storage Device Storing Threshold Value Parameter

The touch detecting circuit according to [3] further includes a storage device that stores parameters (Pt1 to Ptm) for calculation of the threshold value in correspondence with the sensor capacitor that is an object to be detected.

The touch and non-touch detecting circuit has a configuration capable of reading out the parameters from the storage device in accordance with the interconnection length to the sensor capacitor that is an object to be detected, and is capable of calculating the threshold value.

According to this, it is possible to easily provide a configuration capable of individually adjusting the parameters stored in the storage device for each touch panel that is connected thereto. In this configuration, it is easy to adjust the parameters in order for the detection threshold value to be suitable for the type of the touch panel or suitable in relation to an individual difference thereof.

[5] Detection of Touch and Non-Touch by Software (Firmware)

In the touch detecting circuit according to [3] or [4], the touch and non-touch detecting circuit includes a processor (5).

According to this, detection of touch and non-touch or calculation of touch coordinates can be executed by software or firmware.

[6] Detection Circuit Capable of Adaptively Adjusting Detection Sensitivity

The touch detecting circuit according to [1] includes a circuit that charges the sensor capacitor that is an object to be detected, and a detection circuit that detects electrical charges discharged from the sensor capacitor. The detection circuit has a configuration capable of adjusting detection sensitivity in accordance with the interconnection length to a sensor capacitor that is an object to be detected.

According to this, with respect to either a large amount of signals from a sensor capacitor on a near end side or a small amount of signals from a sensor capacitor on a far end side, it is possible to determine touch and non-touch by a detection circuit having detection sensitivity appropriate for each case.

[7] Detection Circuit Including Adjustment Resistor at Input Portion

The touch detecting circuit according to [1] includes a signal line for input from a sensor capacitor that is an object to be detected, a detection circuit that detects electric charges input through the signal line, and a resistor that is connected in series to an input terminal of the detection circuit. The resistor has a configuration capable of adjusting a resistance value in accordance with an interconnection length to the sensor capacitor that is an object to be detected.

According to this, it is possible to adjust a resistance value of the resistor to absorb a difference in interconnection resistance in accordance with an interconnection length from a sensor capacitor on a near end side to a sensor capacitor on a far end side, and thus it is possible to easily adjust detection sensitivity.

[8] Detection Circuit Including Adjustment Resistor at Input Portion

In the touch detecting circuit according to any one of [3] to [7], the detection circuit includes an integration circuit.

According to this, when repeating a plurality of times of charging and discharging with respect to a sensor capacitor, it is possible to integrate an amount of charges corresponding to the sensor capacitor a plurality of times, and thus it is possible to improve detection sensitivity.

[9] Detection Circuit Including Adjustment Resistor at Input Portion

In the touch detecting circuit according to [8], the detection circuit further includes a switched capacitor filter.

According to this, it is possible to improve detection accuracy by performing removal of noise by using the switched capacitor filter.

[10] Touch Panel Controller IC

A semiconductor integrated circuit according to a representative embodiment disclosed in this application includes the touch detecting circuit according to any one of [1] to [9] on a single semiconductor substrate.

According to this, there is provided a touch panel controller IC including the touch detecting circuit with high detection sensitivity.

[11] Display Driver+Touch Panel Controller IC The semiconductor integrated circuit according to [10] further includes a display drive circuit, which is connected to a display panel configured to overlap the touch panel and which is capable of driving and controlling the display panel, on the semiconductor substrate.

According to this, there is provided an IC that is connected to a display and touch panel in which the display panel and the touch panel are laminated and are integrally configured, and thus mutual cooperation of display drive and touch sensing control becomes easy.

[12] Display Driver+Touch Panel Controller+Microcontroller IC

The semiconductor integrated circuit according to [11] further includes a microcontroller (SMPU, 5), which is capable of controlling the touch detecting circuit and is capable of reading out data based on a value of an electrostatic capacitance of the sensor capacitor that is detected, on the semiconductor substrate.

According to this, there is provided an IC in which the microcontroller is further integrated in the same chip, and thus mutual cooperation of display drive and touch sensing control becomes easy. As a result, it is possible to reduce the burden on an application processor that is attached outside.

2. Further Detailed Description of the Embodiments

The embodiments will be described in more detail.

[First Embodiment]

FIG. 1 illustrates an overall configuration of a display and input device 100 to which the invention is applied as an example. The display and input device 100 shown in the same drawing is an example of electronic equipment relating to the invention, and constitutes, for example, a part of a portable terminal such as a personal digital assistant (PDA) and a cellular phone. The display and input device includes a touch panel (TP) 1, a display panel (DP) 2, a touch panel controller (TPC) 3, a display panel controller (DPC) 4, a sub-processor (SMPU) 5, and a host processor (HMPU) 6. The touch panel controller 3, the display panel controller 4, and the sub-processor 5 (as desired) are formed on one semiconductor chip, or are mounted in one package, for example, as a multi-chip module, thereby realizing a single semiconductor device (IC) 101 or 102. Although not particularly limited, for example, the semiconductor device (IC) 101 or 102 is formed on a single semiconductor substrate formed from silicon and the like by using a manufacturing technology of a complementary metal-oxide-semiconductor field effect transistor (CMOSFET) large scale integrated circuit (LSI) that is known. The touch panel controller 3 and the display panel controller 4 are mounted as one chip IC 101, and thus when the touch panel controller 3 and the display panel controller 4 are connected to, for example, an in-cell type display and touch panel in which the display panel 2 and the touch panel 1 are stacked and are integrally configured, mutual cooperation of the display drive and touch sensing control becomes easy. In addition, when the sub-processor (SMPU) 5 is integrated in the same chip 102, mutual cooperation of the display drive and the touch sensing control becomes even easier, and thus it is possible to reduce the burden of a host processor (HMPU) 6 that is attached outside.

In the touch panel 1, a plurality of sensor capacitors are formed. The touch panel controller 3 obtains detection data in accordance with a variation in a capacitive component in each of the sensor capacitors. The sub-processor (SMPU) 5, which is a microprocessor for a sub-system, controls drive of the touch panel 1 and performs a process of detecting a touch state or coordinates from the detection data acquired by the touch panel controller 3. For example, the sub-processor 5 performs a digital filtering operation with respect to the detection data, and performs an operation of calculating the center of a two-dimensional distribution of capacitance values from the data from which noise is removed by the digital filtering operation to calculate touch position coordinates. For example, to indicate the positions of intersections at which a stray capacitance varies, that is, the positions of intersections which a finger approaches (touches, or a contact event occurs), and position coordinates when the contact event occurs are calculated.

The touch panel 1 is constituted by using a transparent (light-transmitting) electrode or a dielectric film, and for example, the touch panel 1 is disposed on a display surface of the display panel 2 to overlap therewith. The touch panel 1 and the display panel 2 may have an in-cell configuration in which the touch panel 1 and the display panel 2 are integrally mounted, an on-cell configuration in which the touch panel 1 and the display panel 2 are individually manufactured and are mounted so as to overlap each other, or a cover-glass-integrated configuration in which the touch panel 1 and a cover glass provided on an upper surface are integrally formed.

The host processor (HMPU) 6 generates display data, and the display panel controller 4 performs display control of displaying the display data received from the host processor 6 on the display panel 2. The host processor 6 acquires position coordinate data from the sub-processor 5 when the contact event occurs, and analyzes an input by manipulation of the touch panel 1 from a relationship between the position coordinate data in the display panel 2 and a display screen that is displayed by the display panel controller 4.

Although not particularly limited, a communication control unit, an image processing unit, a voice processing unit, and an accelerator in addition to the units, which are not shown in the drawing, are embedded in the host processor 6, or are connected to the host processor 6, thereby constituting, for example, a portable terminal.

Figure 2:
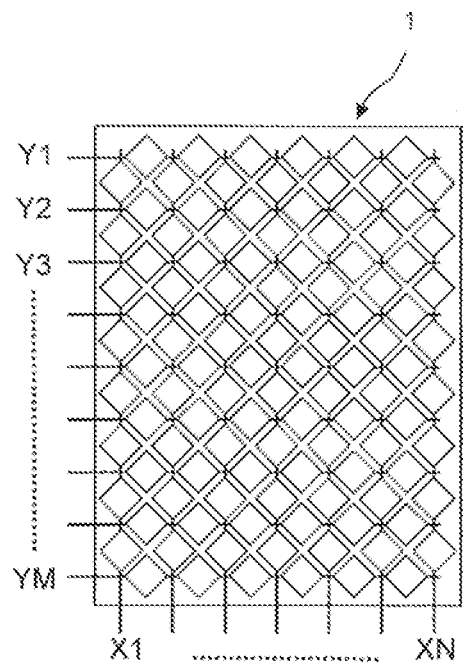
FIG. 2 is a plan view illustrating an electrode configuration of a touch panel.

FIG. 2 illustrates an electrode configuration of the touch panel 1 as an example. The touch panel 1 has a configuration in which the plurality of drive electrodes (Y electrodes) Y1 to YM (also described as Y electrodes Ym) that are formed in a horizontal direction, and the plurality of detection electrodes (X electrodes) X1 to XN (also described as an X electrode Xn) that are formed in a vertical direction are electrically insulated from each other. The sensor capacitor is formed at the intersections of the X electrodes and the Y electrodes through a capacitive electrode of each of the electrodes. The sensor capacitor is also referred to as an intersection capacitor or an intersecting capacitor. In a mutual-capacitance type, when an object such as a finger approaches the sensor capacitor, a stray capacitance, which occurs when the object constitutes a capacitive electrode, is added to a capacitance value of the sensor capacitor. For example, a drive pulse from the touch panel controller 3 is applied to the Y electrodes Y1 to YM in the arrangement order thereof to drive these electrodes. A self-capacitance type has a configuration capable of measuring a variation in a capacitance value of each of the sensor capacitor for each of the X electrodes and/or for each of the Y electrodes. FIG. 2 illustrates the touch panel 1 in which an electrode shape is a rhombic shape, but the electrode shape may be other shapes such as a lattice shape.

Figure 3:
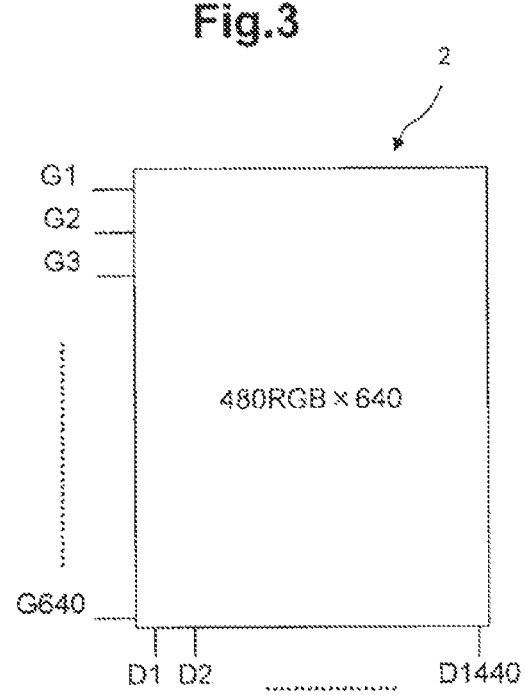
FIG. 3 is a plan view illustrating an electrode configuration of a display panel.

FIG. 3 illustrates an electrode configuration of the display panel 2. The display size of the display panel 2 which is shown in the same drawing is, for example, a size of 480 RGB×640 that is, VGA. In the display panel 2, gate electrodes G1 to G640 as scanning electrodes that are formed in a horizontal direction and drain electrodes D1 to D1440 as signal electrodes that are formed in a vertical direction are disposed, a selection terminal is connected to a corresponding scanning electrode at intersections of the gate electrodes and the drain electrodes, and a plurality of display cells in which an input terminal is connected to a corresponding signal electrode are disposed. For example, a scanning pulse is applied to the gate electrodes G1 to G640 from the display panel controller 4 in the arrangement order of the gate electrodes to drive (scanning-drive) the gate electrodes G1 to G640. Grayscale data of a scanning drive line is supplied to the drain electrodes D1 to D1440 in synchronization with the scanning drive of the gate electrode. The display size of the display panel 2 is arbitrary and not limited to the illustrated display size.

Figure 4:
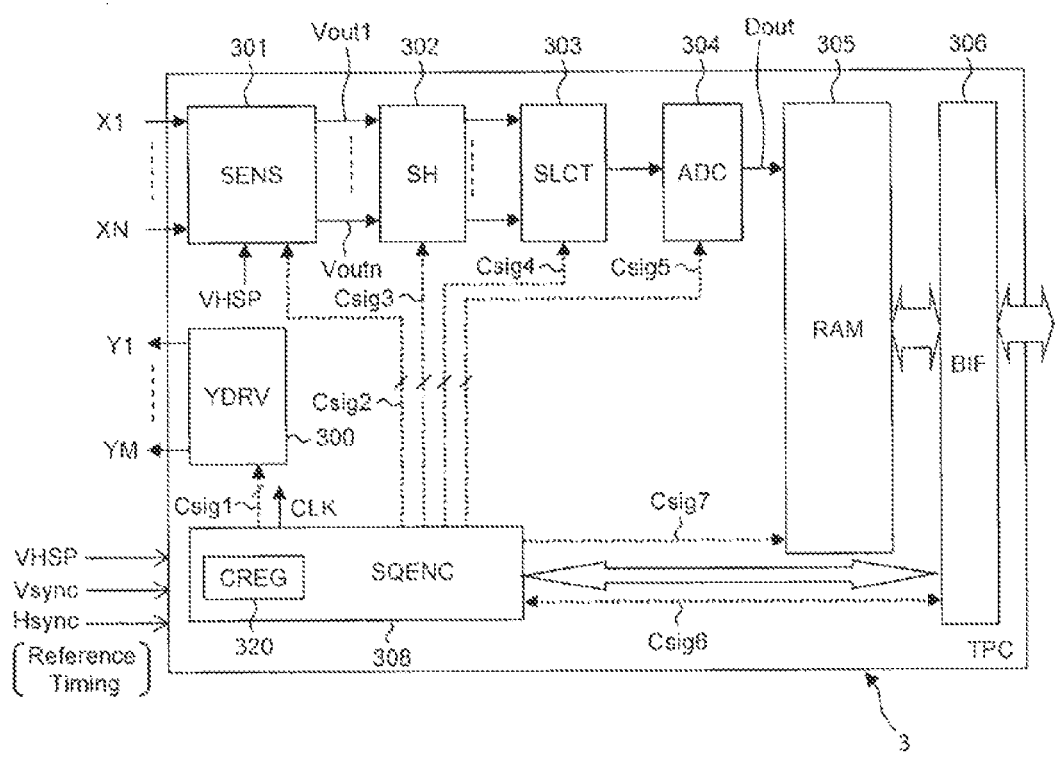
FIG. 4 is a block diagram illustrating an overall configuration of a touch panel controller.

FIG. 4 illustrates an overall configuration of the touch panel controller 3. The touch panel controller 3 includes a drive circuit (YDRV) 300 (also referred to herein as a "touch drive circuit"), a touch detecting circuit (SENS) 301, a sample-and-hold circuit (SH) 302, a selector (SLCT) 303, an analog/digital conversion circuit (ADC; hereinafter, abbreviated as an AD conversion circuit) 304, a random access memory (RAM) 305, a bus interface circuit (BIF) 306, and a sequence control circuit (SQENC) 308 as a control circuit. It is preferable that the sequence control circuit (SQENC) 308 includes a control register (CREG) 320 which can set a control sequence in a programmable manner. The control register (CREG) 320 may be constituted by a nonvolatile storage element, or may be constituted by a volatile storage element and have a configuration in which initialization or appropriate modification (rewriting) thereof can be performed by the sub-processor (SMPU) 5 and the like.

The drive circuit (YDRV) 300 is provided to drive the Y electrodes Y1 to YM when performing mutual-capacitance type touch detection. In a case of self-capacitance type touch detection, the drive circuit 300 has a function of providing a predetermined potential to the Y electrodes Y1 to YM so as to select a sensor capacitor that is an object to be detected, or in a case of a configuration in which the selection is not necessary, the drive circuit 300 may be omitted.

The touch detecting circuit 301 performs a measurement with respect to sensor capacitors that are connected to the X electrodes X1 to XN, and outputs voltages (Vout_1 to Vout_n and the like) corresponding to the capacitance values thereof. When performing the mutual-capacitance type touch detection, a signal synchronized with a drive pulse is shown in the X electrodes X1 to XN through the sensor capacitors. When a finger of a user comes into contact with or approaches the sensor capacitors, an electric charge that is charged in the sensor capacitors from the drive pulse is removed. A signal, which is generated in association with migration of an electric charge generated in the X electrodes X1 to XN in synchronization with the drive pulse, is input to the touch detecting circuit 301. The touch detecting circuit 301 includes a switched capacitor circuit to which an input signal from the X electrodes is input and which operates as an integration circuit or a filter. A configuration and an operation of the touch detecting circuit 301 will be described in detail in the following embodiments.

Detection signals Vout1 to Voutn which are output from the touch detecting circuit 301 are retained in the sample-and-hold circuit 302 for each detection electrode, the detection signals that are retained are selected by the selector 303, and the detection signals that are selected are converted into digital detection data Dout by the AD conversion circuit 304. The detection data that is converted is stored in the RAM 305. The detection data that is stored in the RAM 305 is supplied to the sub-processor 5 through the bus interface circuit 306, and is provided for the calculation of touch coordinates.

The sequence control circuit 308 controls operations of the drive circuit 300, the touch detecting circuit 301, the sample-and-hold circuit 302, the selector 303, the AD conversion circuit 304, and the bus interface circuit 306 by using control signals Csig1 to Csig6, and performs access control of the RAM 305 with a control signal Csig7. For example, a vertical synchronization signal Vsync or a horizontal synchronization signal Hsync from the outside is input to the sequence control circuit 308 as a reference signal (Reference Timing) of timing, and the sequence control circuit 308 performs sequence control in synchronization with a clock CLK that is separately input or generated internally.

Figure 5:
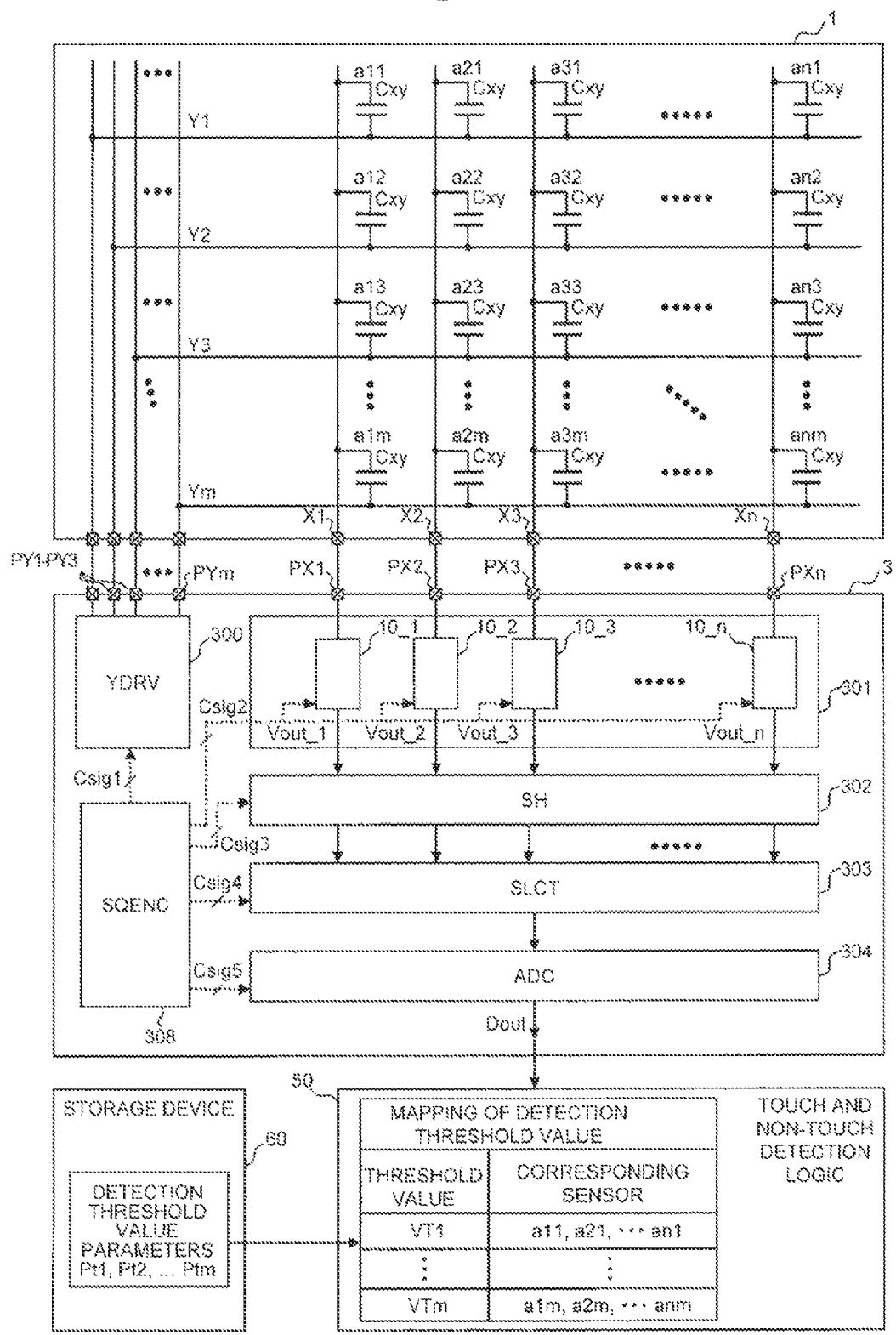
FIG. 5 is a block diagram illustrating a configuration example of an equivalent circuit of the touch panel, a touch detecting circuit according to a first embodiment, and a touch panel controller including the touch detecting circuit.

FIG. 5 is a block diagram illustrating a configuration example of a corresponding circuit of the touch panel, the touch detecting circuit 301 according to the first embodiment, and the touch panel controller 3 including the touch detecting circuit 301. The touch panel controller 3 is provided with terminals PY1 to PYm for drive of the Y electrodes Y1 to YM, and terminals PX1 to PXn for measurement of capacitance values of sensor capacitors a11 to a1$m$, a21 to a2$m$, a31 to a1$m$, . . . , an1 to anm which are connected to the X electrodes X1 to XN, respectively, or an amount of variation in the capacitance values. The touch panel controller 3 includes the touch detecting circuit 301, the sample-and-hold circuit 302, the selector 303, the AD conversion circuit 304, the drive circuit 300, and the sequence control circuit 308, and a touch and non-touch detection logic 50 and a storage device 60 are attached outside. The touch and non-touch detection logic 50 is mounted as software that is executed, for example, by the sub-processor (SMPU) 5 shown in FIG. 1, and the storage device 60 is a storage device that can access to the sub-processor (SMPU) 5. In addition, the touch and non-touch detection logic 50 may be mounted inside the touch panel controller 3, for example, as a logic circuit of the hardware.

The touch detecting circuit 301 is provided with detection circuits 10_1 to 10_n that are connected to the terminals PX1 to PXn, respectively, and outputs output voltages Vout_1 to Vout_n corresponding to capacitance values of the sensor capacitors a11 to a1$m$, . . . , an1 to anm or an amount of variation thereof. The outputs Vout_1 to Vout_n of the touch detecting circuit 301 are transmitted to the sample-and-hold circuit (SH) 302 and are retained therein as voltage values. The selector (SLCT) 303 sequentially selects the voltage values retained in the sample-and-hold circuit (SH) 302 on the basis of the control signal Csig4, and inputs the selected voltage values to the AD conversion circuit 304. The AD conversion circuit 304 converts the input voltage values into digital values Dout. The digital values Dout are transmitted to the touch and non-touch detection logic 50, and touch and non-touch detection is performed by analyzing the values.

To detect capacitance values of the sensor capacitors a11 to a1m, . . . , an1 to anm or an amount of variation thereof, the drive circuit 300 repeats an operation of sequentially outputting a drive pulse to the Y electrodes Y1 to YM to charge the sensor capacitors at a predetermined timing. When a pulse is applied to the electrode Y1, the sensor capacitors a11, a21, a31, . . . , an1 of a first row are charged, and electric charges used for charging are shown in parallel in the X electrodes X1 to Xn, and an amount of the electric charges is detected in parallel by using the detection circuits 10_1 to 10_n. Then, a pulse is sequentially applied to the Y electrodes Y2, Y3, . . . to detect capacitance values or an amount of variation thereof by sequentially setting the sensor capacitors a12, a22, . . . , an2 of a second row, and the sensor capacitors a13, a23, . . . , an3 of a third row as a target. In a more preferred embodiment, the drive pulse that is supplied to each of the Y electrodes is controlled with a constant number of pulses, and the detection circuits 10_1 to 10_n accumulatively add (integrate) an amount of electric charge, which is input thereto, a plurality of times to amplify the amount of signals.

In the sensor capacitors a11 to a1m arranged in the first row among the sensor capacitors a11 to a1m, . . . , an1 to anm, a11 is a sensor capacitor on a far end side and a1m is a sensor capacitor on a near end side when viewed from the terminal PX1 of the touch panel controller 3, and in the sensor capacitors an1 to anm, an1 is a sensor capacitor on a far end side and anm is a sensor capacitor on a near end side when viewed from the terminal PXn. A threshold value VT1 is given to Dout obtained from the sensor capacitors a11, a21, a31, . . . , an1 on a far end side, and a threshold value VTm is given to Dout obtained from the sensor capacitors a1m,a2m, a1m, . . . , anm on a near end side. An interconnection with the sensor capacitors a11, a21, a31, . . . , an1 on far end side is longer than an interconnection with the sensor capacitors a1m, a2m, a1m, . . . , anm on a near end side, and thus interconnection resistance increases. Therefore, a signal transmitted through the interconnection is attenuated, and thus Dout that is obtained becomes relatively small.

In this embodiment, in accordance with this phenomenon, the threshold values for determination of touch and non-touch are mapped in such a manner that the threshold value VT1 corresponding to the sensor capacitors a11, a21, . . . , an1 on a far end side becomes a value smaller than that of the threshold value VTm corresponding to the sensor capacitors a1m, a2m, . . . , anm on a near end side (mapping of detection threshold values). On the basis of an amount of attenuation of a signal due to the interconnection resistance, the threshold values VT1 to VTm, which correspond to sensor capacitors from a far end side to a near end side, may be set to values that gradually vary to cancel the amount of attenuation. The threshold values may be grouped for each region. The storage device 60 is connected to the touch and non-touch detection logic 50, and detection threshold value parameters Pt1 to Ptm corresponding to the threshold values VT1 to VTm, which correspond to the sensor capacitors from a far end side to a near end side, are stored in the storage device 60. The detection threshold value parameters Pt1 to Ptm can be appropriately read out by the touch and non-touch detection logic 50 for use. The touch and non-touch detection logic 50 can adaptively change the values of the threshold values in accordance with the interconnection length to the sensor capacitors by using the detection threshold value parameters Pt1 to Ptm. Here, each of the threshold values may be a threshold value for determination of touch and non-touch at a point, at which the sensor capacitor is disposed, from independent Dout, or may be a threshold value for determination of a variation (an increment of a capacitance) from the periphery in a two-dimensional distribution.

According to this, it is possible to perform adjustment to cancel attenuation of an amount of signals in accordance with a distance from the sensor capacitors to the touch detecting circuit, and thus it is possible to stably detect signals transmitted from the sensor capacitors from a far end side to a near end side.

[Second Embodiment]

According to another embodiment of the invention, characteristics of the detection circuits 10_1 to 10_n are adaptively changed to cancel the amount of variation in the resistance value of the interconnection resistance in accordance with a sensor capacitor that is an object to be detected. For example, input impedance of the detection circuits 10_1 to 10_n is adaptively changed in order to cancel the amount of variation in the interconnection resistance corresponding to each of the sensor capacitors from a far end side to a near end side. In addition, the sensitivity or gain of the detection circuits 10_1 to 10_n is adaptively changed in order to cancel the amount of variation in the interconnection resistance corresponding to each of the sensor capacitors from a far end side to a near end side. As described in the first embodiment, the threshold value for determination of touch and non-touch may be configured to be adaptively changed in accordance with the interconnection length to the sensor capacitor that is an object to be detected. In addition, similar to this embodiment, the characteristics of the detection circuits 10_1 to 10_n may be configured to be adaptively changed to cancel the amount of variation in the resistance value of the interconnection resistance in accordance with the sensor capacitor that is an object to be detected. In addition, the above-described configurations maybe combined. According to this, it is possible to perform adjustment to cancel attenuation in an amount of signals in accordance with a distance from the sensor capacitors to the touch detecting circuit, and thus it is possible to stably detect signals transmitted from the sensor capacitors from a far end side to a near end side.

Figure 6:
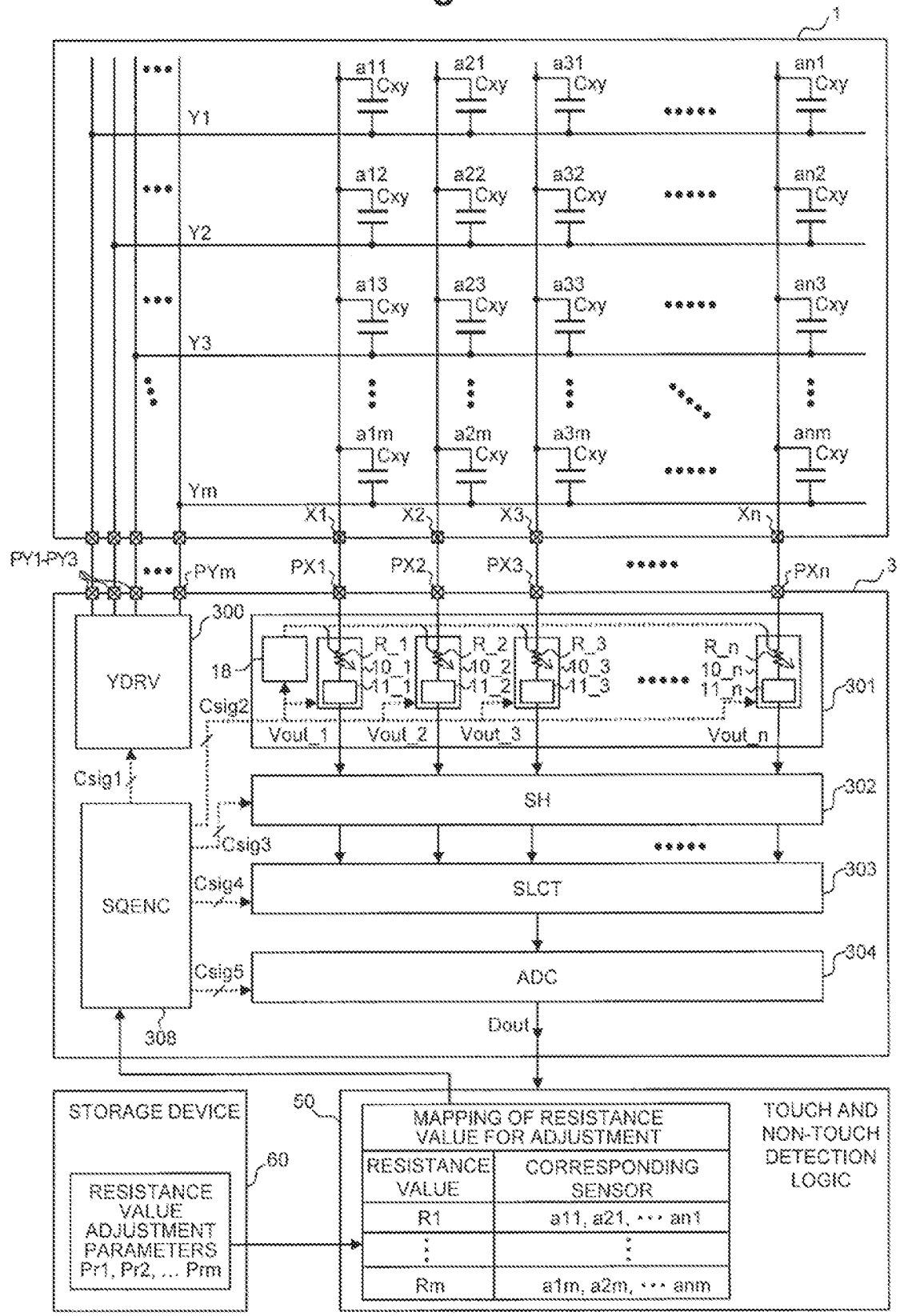
FIG. 6 is a block diagram illustrating a configuration example of the equivalent circuit of the touch panel, a touch detecting circuit according to a second embodiment, and a touch panel controller including the touch detecting circuit.

FIG. 6 is a block diagram illustrating a configuration example of the equivalent circuit of the touch panel, a touch detecting circuit 301 according to a second embodiment, and a touch panel controller 3 including the touch detecting circuit 301. The overall configuration of the display and input device 100 may be the same as in the first embodiment described with reference to FIGS. 1 to 4. Similar to FIG. 5, the touch panel controller 3 is provided with terminals PY1 to PYm for drive of the Y electrodes Y1 to YM, and terminals PX1 to PXn for measurement of the capacitance values of sensor capacitors a11 to a1m, . . . , an1 to anm which are connected to the X electrodes X1 to XN, respectively, or an amount of variation in the capacitance values. The touch panel controller 3 includes a touch detecting circuit 301, a sample-and-hold circuit 302, a selector 303, an AD conversion circuit 304, a drive circuit 300, and a sequence control circuit 308, and a touch and non-touch detection logic 50 and a storage device 60 which are attached outside.

The touch detecting circuit 301 is provided with detection circuits 10_1 to 10_n which are connected to the terminals PX1 to PXn, respectively, and an input impedance control circuit 18, and outputs output voltages Vout_1 to Vout_n corresponding to capacitance values of the sensor capacitors a11 to a1m, . . . , an1 to anm or an amount of variation thereof. The detection circuits 10_1 to 10_n are provided with integration circuits 11_1 to 11_n, respectively, and are provided with adjustment resistors R_1 to R_n, which adjust input impedance, respectively, at respective input portions. The resistance value of the adjustment resistors R_1 to R_n is controlled by the input impedance control circuit 18. The outputs Vout_1 to Vout_n of the touch detecting circuit 301 are transmitted to the sample-and-hold circuit (SH) 302 and are retained therein as a voltage value similar to that in the first embodiment. The other configurations are the same as in the first embodiment, and thus a detailed description thereof will not be repeated.

To detect capacitance values of the sensor capacitors a11 to a1m, an1 to anm or an amount of variation thereof, the drive circuit 300 repeats an operation of sequentially outputting a drive pulse to the Y electrodes Y1 to YM to charge the sensor capacitors at a predetermined timing. When a pulse is applied to the Y electrode Y1, the sensor capacitors a11, a21, a31, an1 of a first row are charged, and an amount of electric charges used for charging is shown in parallel in the X electrodes X1 to Xn, and an amount of the electric charges is detected in parallel by using the detection circuits 10_1 to 10_n. Then, a pulse is sequentially applied to the Y electrodes Y2, Y3, . . . to detect capacitance values or an amount of variation thereof by sequentially setting the sensor capacitors a12, a22, a32, . . . , an2 of a second row, and the sensor capacitors a13, a23, a33, . . . , an3 of a third row as a target.

At this time, in a case of detecting capacitance values of the sensor capacitors a11, a21, a31, . . . , an1 and of the first row on a far end side or an amount of variation thereof, the input impedance control circuit 18 adjusts the resistance value of the adjustment resistors R_1 to R_n to the smallest value R1 in synchronization with application of a charging pulse to the Y electrode Y1. Then, in a case of sequentially setting the sensor capacitors a12, a22, . . . , an2 of the second row, and the sensor capacitors a13, a23, . . . , an3 of the third row as an object to be detected, the input impedance control circuit 18 gradually increases the resistance value of the adjustment resistor R_2, R_3 to a resistance value R2, R3 in synchronization with application of a charging pulse to the Y electrode Y2, Y3. Then, when the sensor capacitors a1m, a2m, . . . , anm of a $m^{th}$ row on a near end side are set as an object to be detected, the input impedance control circuit 18 adjusts the resistance value of the adjustment resistors R_1 to R_n to the largest value Rm in synchronization with application of a charging pulse to the Y electrode Ym. As described above, it is possible to adjust the values of the interconnection resistance from the terminals PX1 to PXn to the sensor capacitors, which are objects to be detected, to be cancelled with the resistance values of the adjustment resistors R_1 to R_n. The resistance values of the adjustment resistors R_1 to R_n may be gradually changed as described above, but may be collectively set to the same value for each region of a certain extent. The sequence control circuit (SQENC) 308 controls timing of applying a charging pulse applied to the Y electrodes Y1 to YM with the control signal Csig1, and timing of adjusting resistance values of the adjustment resistors R_1 to R_n with the control signal Csig2. In a more preferred embodiment, the drive pulse that is supplied to each of the Y electrodes is controlled with a constant number of pulses, and the integration circuits 11_1 to 11_n inside the detection circuits 10_1 to 10_n integrate an amount of electric charges, which is input thereto, a plurality of times in order to increase the amount of signals.

In this embodiment, in the touch and non-touch detection logic 50, the resistance values of the adjustment resistors R_1 to R_n are mapped in such a manner that the resistance value R1 corresponding to the sensor capacitors a11, a21, . . . , and on a far end side becomes a value smaller than the resistance value Rm corresponding to the sensor capacitors a1m, a2m, . . . , anm on a near end side (mapping of resistance values for adjustment), and are supplied to the sequence control circuit (SQENC) 308. On the basis of an amount of attenuation of signals due to the interconnection resistance, the resistance values R1 to Rm corresponding to the sensor capacitors from a far end side to a near end side can be set to values that gradually vary so as to cancel the amount of attenuation. The storage device 60 is connected to the touch and non-touch detection logic 50, and resistance adjustment parameters Pr1 to Prm corresponding to the resistance values R1 to Rm, which correspond to the sensor capacitors from a far end side to a near end side, are stored in the storage device 60. The resistance adjustment parameters Pr1 to Prm can be appropriately read out by the touch and non-touch detection logic 50 for use. The touch and non-touch detection logic 50 can adaptively change the resistance values of the adjustment resistors R_1 to R_n in accordance with the interconnection length to the sensor capacitors by using the resistance adjustment parameters Pr1 to Prm.

[Third Embodiment]

Figure 7:
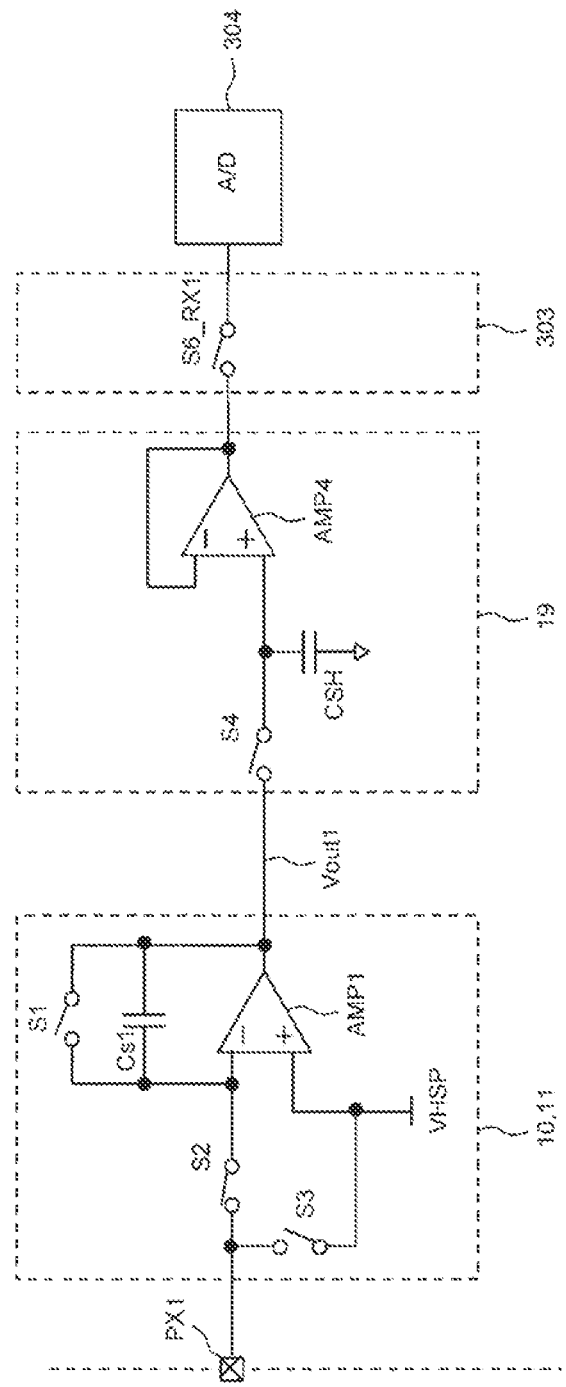
FIG. 7 is a circuit diagram illustrating a configuration example and a connection example of a touch detecting circuit of a third embodiment.

FIG. 7 is a circuit diagram illustrating a configuration example and a connection example of a touch detecting circuit of a third embodiment. A detection circuit 10 shown in FIG. 7 is an example of the detection circuits 10_1 to 10_n which are connected to the terminals PX1 to PXn in the touch panel controller 3 shown in FIG. 5. The detection circuit 10 constituted by an integration circuit 11 is connected to the input terminal PX1, and a sample-and-hold circuit 19 corresponding to one signal in the sample-and-hold circuit 302 is connected to an output of the detection circuit 10, and an output of the sample-and-hold circuit 19 is connected to the AD conversion circuit 304 through a switch S6_RX1 in the selector 303. The integration circuit 11 that constitutes the detection circuit 10 is provided with an operational amplifier AMP1 of which a positive side input (+) is fixed to a predetermined potential VHSP, and an integration capacitor Cs1 and a switch S1 are connected in parallel with each other between a negative side input (−) and an output Vout1 of the operational amplifier AMP1. A switch S2 is connected between the input terminal PX1 and the negative side input (−) of the operational amplifier AMP1. The input terminal PX1 can be initialized to the predetermined potential VHSP with a switch S3. For example, even when application of a pulse that drives the Y electrodes and the timing of the switch S2 deviate from each other, the potential of the X electrodes can be initialized to the predetermined potential VHSP with the switch S3. In the integration circuit 11, when the switch S1 is closed, the integration capacitor Cs1 is discharged and initialized. Whenever the switch S2 is closed, the integration circuit 11 performs an integration operation of accumulatively adding an electric charge input from the X electrodes by the integration capacitor Cs1. The sample-and-hold circuit 19 includes a switch S4, a sample-and-hold capacitor CSH, and an operational amplifier AMP4. A negative side input (−) and an output terminal are short-circuited, and thus the operational amplifier AMP4 constitutes a voltage follower amplifier. A positive side input (+) of the operational amplifier AMP4, which is an input of the voltage follower amplifier, is connected to the sample-and-hold capacitor CSH between the positive side input and a ground potential, and is connected to the switch S4 between the positive side input and the output Vout1 of the integration circuit 11 that is the detection circuit 10. The switches S1 to S3 are controlled by the control signal Csig2, and the switch S4 is controlled by the control signal Csig3.

Figure 8:
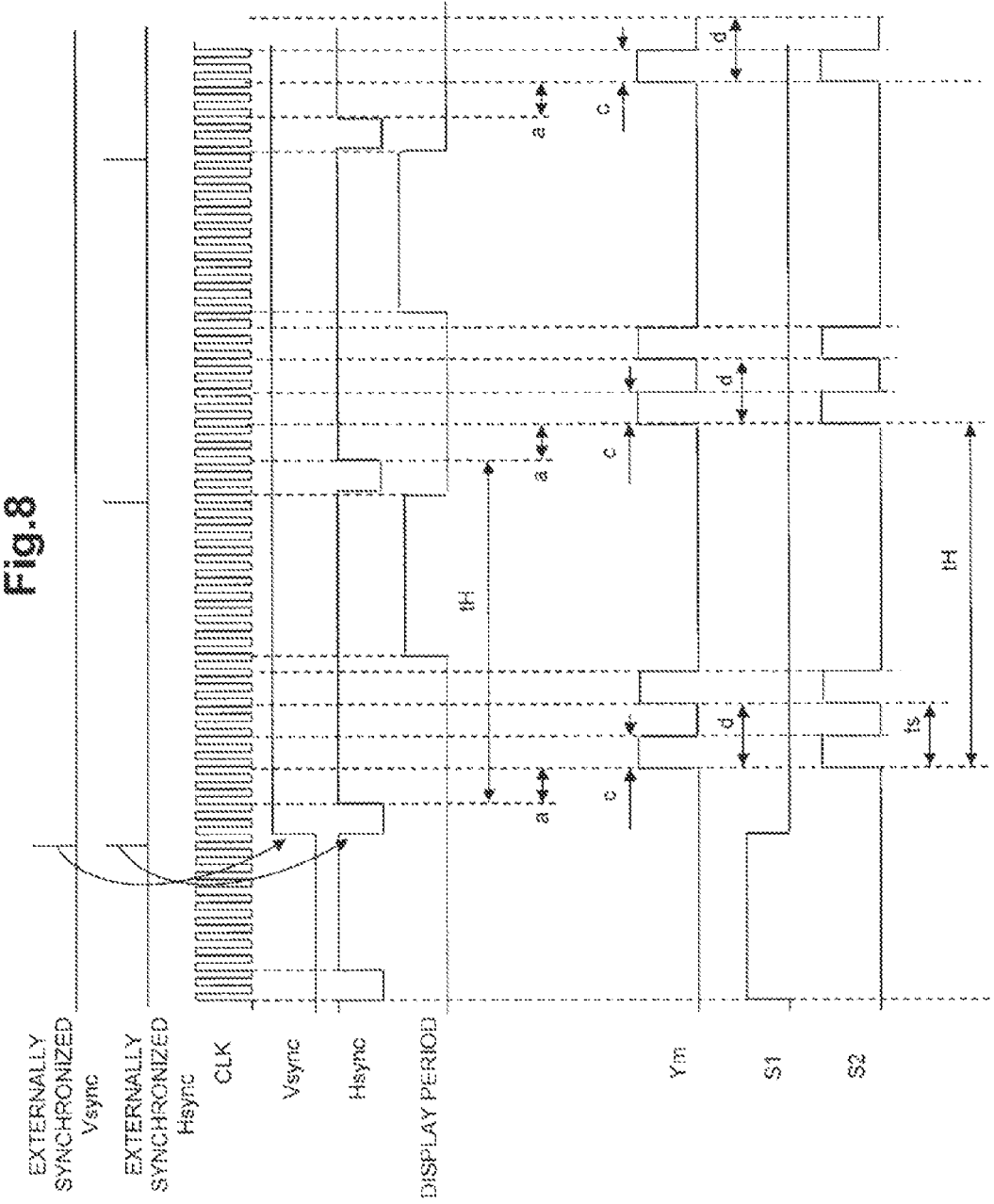
FIG. 8 is a timing chart illustrating an operation example of the touch detecting circuit of the third embodiment.

FIG. 8 is a timing chart illustrating an operation example of the touch detecting circuit of the third embodiment.

Time is shown on the horizontal axis. Externally synchronized vertical synchronization signal Vsync and horizontal synchronization signal Hsync, clock CLK, vertical synchronization signal Vsync and the horizontal synchronization signal Hsync inside the IC 101, a signal indicating a display period, a signal that is applied to the Y electrodes Ym, and signals that control the switches S1 and S2 are shown on the vertical axis in this order from an upper side thereof. The internal vertical synchronization signal Vsync and the horizontal synchronization signal Hsync are generated in synchronization with the externally synchronized vertical synchronization signal Vsync and horizontal synchronization signal Hsync, respectively. The internal vertical synchronization signal Vsync is configured to rise in synchronization with the externally synchronized vertical synchronization signal Vsync, and the internal horizontal synchronization signal Hsync is configured, for example, to fall in synchronization with the externally synchronized horizontal synchronization signal Hsync and to rise after a predetermined period, which is in synchronization with the clock CLK, for synchronization with the clock CLK.

As shown in the same drawing, the display period is provided at a part of one line period "tH" (the latter half in the drawing), and in a case where touch detection is performed before initiation of the display period, a pulse applied to the electrodes Ym rises after a predetermined period "a" from the rising of the Hsync, and is repetitively output before initiation of the display period in a high period "c" and at a cycle "d". FIG. 8 illustrates an example in which two pulses are output for every one line, but the number of pulses varies according to the length of the display period in the one line period "tH". When the display period is lengthened, a period capable of being allocated to the touch detection is shortened, and thus touch detection sensitivity and accuracy decrease. It is necessary for the display panel 2 and the display panel controller 4 to respond at a highspeed so as to shorten the display period. A control signal of the switch S1 becomes "high" before the initiation of application of a series of pulses to the electrodes Ym, and returns to "low". Accordingly, the integration capacitor Cs1 of the integration circuit 11 is short-circuited and discharged, and is initialized. The control signal of the switch S1 is controlled in synchronization with the application of the series of pulses to the electrodes Ym. That is, the control signal rises after the predetermined period "a" from the rising of the Hsync, and is repetitively output before initiation of the display period at a cycle "ts". It is not necessary for the length of the high period to be made to be equal to a high period "c" of a pulse that is applied to the Y electrodes. Electric charges generated when pulses are applied to the electrodes Ym are taken into the integration circuit 11 by closing the switch S2, and signal charges, which are integrated a predetermined number of times, that is, which are repetitively taken in, are accumulatively added to the integration capacitor Cs1. In the display period, application of a pulse to the electrodes Ym is stopped, and thus the switch S2, which controls input to the integration circuit 11 that operates in synchronization with the application, is also opened in the period, and thus operation of the integration circuit 11 is stopped. Input to the integration circuit 11 is stopped in the display period, but an integration value is retained in the integration capacitor Cs1. Accordingly, when the input restarts, the integration operation restarts, and thus signal charges are integrated in correspondence with the input of a predetermined number of pulses. As described above, the integration circuit 11 that constitutes the detection circuit 10 intermittently operates at the sampling cycle "ts". In addition, "high/low" of the signals shown in FIG. 8 is illustrative only, and is appropriately defined in accordance with the positive logic and the negative logic of a circuit that is constructed. This is also true of other timing charts.

Figure 9:
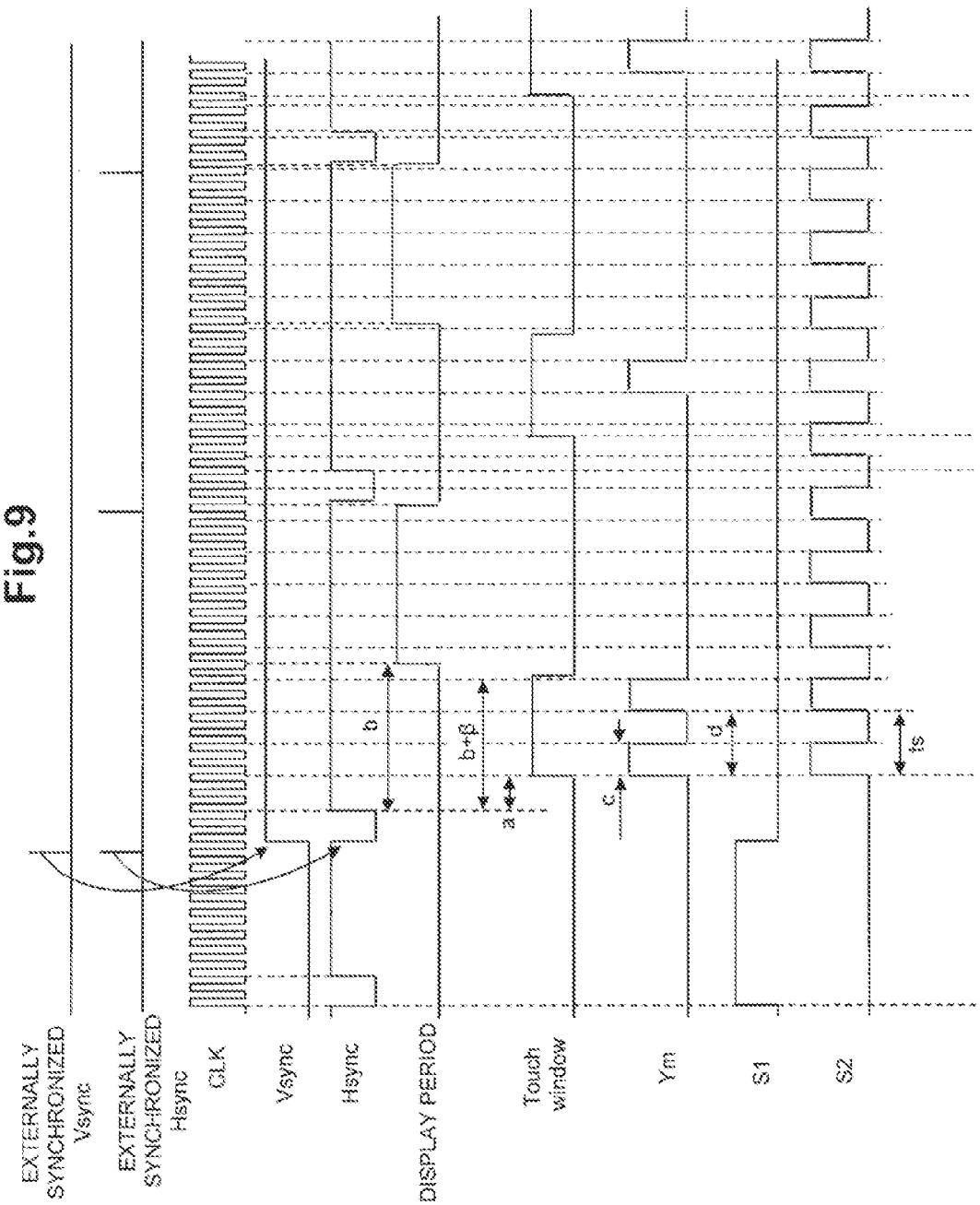
FIG. 9 is a timing chart illustrating another operation example of the touch detecting circuit of the third embodiment.

FIG. 9 is a timing chart illustrating another operation example of the touch detecting circuit of the third embodiment. Time is shown on the horizontal axis. The externally synchronized vertical synchronization signal Vsync and horizontal synchronization signal Hsync, the clock CLK, the vertical synchronization signal Vsync and the horizontal synchronization signal Hsync inside the IC 101, the signal indicating a display period, a signal (touch window) indicating a touch window, a signal that is applied to the Y electrodes Ym, and signals that control the switches S1 and S2 are shown on the vertical axis in this order from an upper side thereof. The externally synchronized vertical synchronization signal Vsync and horizontal synchronization signal Hsync, the clock CLK, the vertical synchronization signal Vsync and the horizontal synchronization signal Hsync inside the IC 101, the signal indicating the display period, and the signal applied to the Y electrodes Ym, and the operation of the switch S1 are the same as those in the operation example described above with reference to FIG. 8, and thus description thereof will not be repeated.

In FIG. 9, the touch window as timing information indicating the touch detection period is shown. The touch window is set in a range not overlapping the display period, and is a signal indicating a period in which the touch panel controller is allowed to operate a touch detection operation. The touch window may rise after the period "a" from the rising of the internal horizontal synchronization signal Hsync, and may fall after "b+β (β0)" with a margin "β" in comparison to falling after a period "b" from the rising of the Hsync at which the display period is initiated. For example, the touch window is input as a timing signal TPCtiming from the display panel controller 4, or is generated in the sequence control circuit (SQENC) by applying "a", "b", and "13" to the control register 320 as parameters. Output of the pulse applied to the Y electrodes Ym is limited to a range of the touch window. According to this, it is possible to adjust the margin in such a manner that the Y electrode drive pulse does not have an effect on display data in the display period and does not deteriorate image quality.

A characteristic of the detection circuit 10 shown in FIG. 9 is in the operation of the switch S2. In the operation example which is shown in FIG. 8, the switch S2 is opened in the display period in synchronization with the pulse applied to the electrodes Ym. In contrast, in the operation example shown in FIG. 9, the taking-in of a signal charge from the X electrodes continues at the same cycle "ts" even in a period in which output of the pulse to the electrodes Ym is stopped. Since the operation of the detection circuit 10 continues even in the display period, but the output of the pulse to the electrodes Ym is stopped, the display data is not affected and thus the image quality does not deteriorate. According to the operation shown in FIG. 9, frequency characteristics of the integration circuit 11 that is the detection circuit 10 are significantly improved. The integration circuit 11 is a kind of a switched capacitor circuit and has low-pass characteristics. In addition, the switched capacitor circuit is a discrete system, and thus has periodic frequency characteristics which are folded back with a unit of a sampling frequency that is a reciprocal of the cycle "ts". Accordingly, the frequency characteristics of the integration circuit 11 that is the detection circuit 10 have pass characteristics in which a gain is 1 (no attenuation) at a frequency of 0 (zero, that is, a direct current) and a sampling frequency. As shown in FIG. 8, when the integration circuit 11 is allowed to intermittently operate at the cycle "tH" of the horizontal synchronization signal in accordance with the display period and the touch detection period, pass characteristics having a peak overlap each other for each frequency that is the reciprocal of the cycle "tH". On the other hand, as shown in FIG. 9, when a sampling operation of the integration circuit 11 is allowed to continue not only in the touch detection period but also in the display period, a peak caused by the cycle "tH" of the horizontal synchronization signal does not appear, and satisfactory low-pass characteristics can be obtained.

Hereinbefore, an embodiment, in which the detection circuit 10 shown in FIG. 7 is mounted in the touch detecting circuit 301 of the touch panel controller 3 of the first embodiment, has been described, but the detection circuit 10 may be mounted as the detection circuits 10_1 to 10_n in the touch panel controller 3 of the second embodiment shown in FIG. 6.

[Fourth Embodiment]

Figure 10:
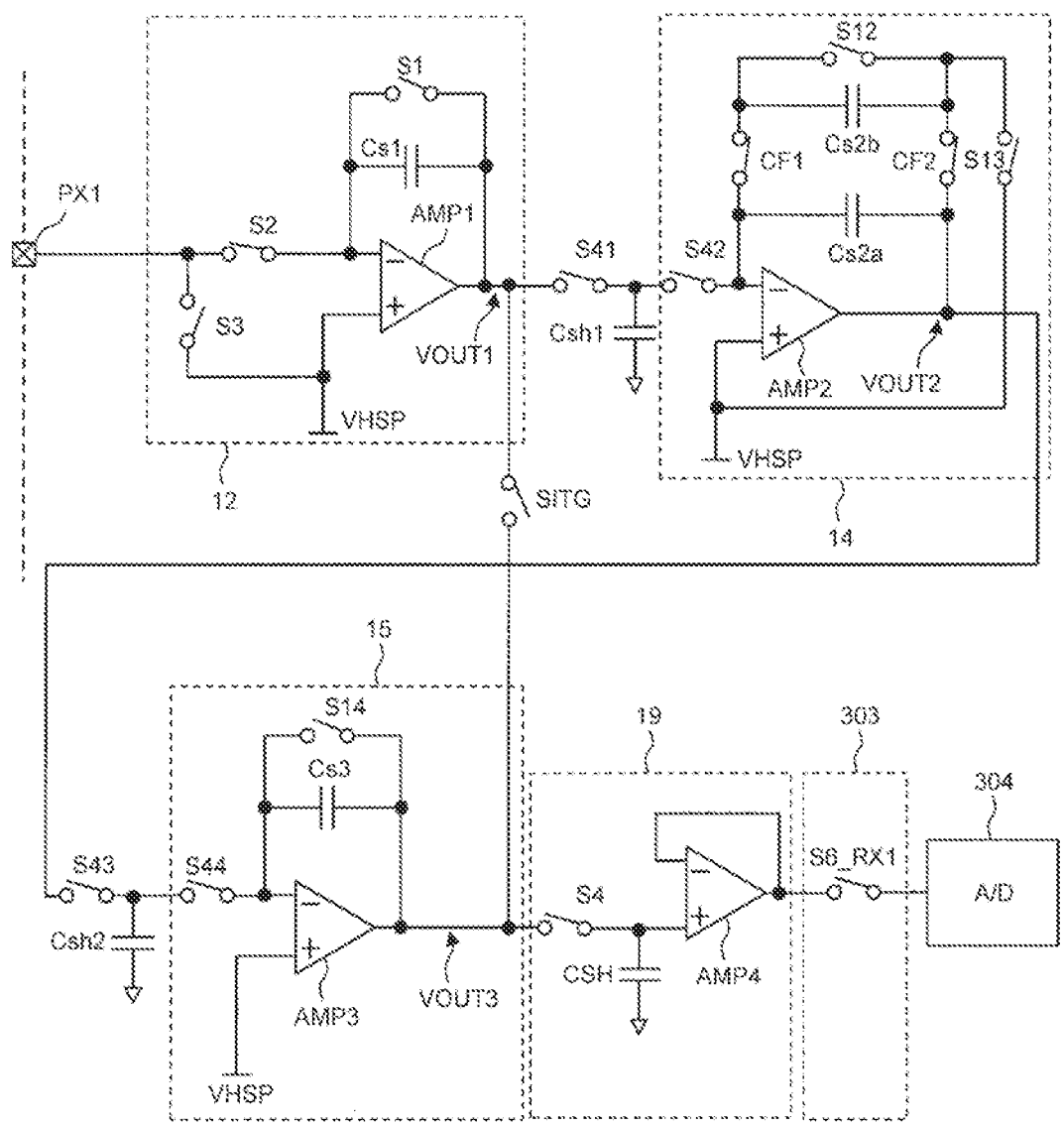
FIG. 10 is a circuit diagram illustrating a configuration example and a connection example of a touch detecting circuit (single edge detection type) of a fourth embodiment.

FIG. 10 is a circuit diagram illustrating a configuration example and a connection example of a touch detecting circuit (single edge detection type) of a fourth embodiment. In FIG. 10, an example of a configuration of a circuit, which is connected to one of the detection electrodes (X electrodes), among the touch detecting circuit 301, the sample-and-hold circuit 302, and the selector 303 is shown. For example, the circuit is connected to the detection electrode (X electrode) X1, for example, through a terminal PX1. A detection circuit 10 that is connected to one detection electrode (X1) includes first and second switched capacitor circuits 12 and 14, and an integration circuit 15. The detection circuit 10 constituted by the first and second switched capacitor circuits 12 and 14, and the integration circuit 15 maybe used, for example, as the detection circuits 10_1 to 10_n which are connected to the terminals PX1 to PXn in the touch panel controller 3 of the first embodiment shown in FIG. 5. In addition, the integration circuit 15 can substitute for the integration circuits 11_1 to 11_n in the touch panel controller 3 of the second embodiment shown in FIG. 6.

In the detection circuit 10, an output of the first switched capacitor circuit 12 is transmitted to the second switched capacitor circuit 14 through a switch S41 and a sample-and-hold capacitor Csh1, and an output of the second switched capacitor circuit 14 is transmitted to an integration circuit 15 through a switch S43 and a sample-and-hold capacitor Csh2. An output of the integration circuit 15 is connected to one sample-and-hold circuit 19, which constitutes the sample-and-hold circuit 302, through a switch S4. An output of the sample-and-hold circuit 19 is connected to the AD conversion circuit 304 through one switch S6_RX1 that constitutes the selector 303. An output of the first switched capacitor circuit 12 may be connected to a switch S4, which is an input of the sample-and-hold circuit 19, through a switch SITG. The output of the first switched capacitor circuit 12 may be transmitted to the sample-and-hold circuit 19 by stopping operations of the second switched capacitor circuit 14 and the integration circuit 15 and by bypassing these circuits. The integration circuit 15 has a configuration in which when an operation thereof is stopped, an output VOUT3 becomes high impedance. The above-described switches, and other respective switches, which are described later, in the first and second switched capacitor circuits 12 and 14 and the integration circuit 15, are controlled by the control signals Csig2 to Csig4 that are output from the sequence control circuit 308.

The first switched capacitor circuit 12 includes an operational amplifier AMP1 in which a positive side input (+) is fixed to a predetermined potential (VHSP). An integration capacitor Cs1 and a switch S1 are connected in parallel with each other between a negative side input (−) and an output VOUT1 of the operational amplifier AMP1. A switch S2 is connected to between the input terminal PX1 and the negative side input (−) of the operational amplifier AMP1. The input terminal PX1 may be fixed to the predetermined potential VHSP with a switch S3. For example, the input terminal PX1 can be fixed to the predetermined potential VHSP with the switch S3 in order for a potential of the X electrodes not to vary even when application of a pulse that drives the Y electrodes and a timing of the switch S2 deviate from each other. As described later, the first switched capacitor circuit 12 can be allowed to operate as a finite impulse response (FIR) filter, a QV converter, or an integration circuit by appropriately controlling the timing of the switches S1 to S3, and the switch S41 that controls transmission to the sample-and-hold capacitor Csh1 of a subsequent stage. The second switched capacitor circuit 14 includes an operational amplifier AMP2 having a configuration in which a positive side input (+) is fixed to a predetermined potential VHSP. Integration capacitors Cs2a and Cs2b and a switch S12 are connected in parallel with each other between a negative side input (−) and an output VOUT2 of the operational amplifier AMP2. The integration capacitors Cs2a and Cs2b are connected in parallel with each other or are separated from each other by switches CF1 and CF2. One or both of the integration capacitors Cs2a and Cs2b are configured to be short-circuited and discharged with the switch S12 and to be initialized to the predetermined potential VHSP with a switch S13. That is, the integration capacitors Cs2a and Cs2b are configured in such a manner that a part (only Cs2b) or the entirety (Cs2a+Cs2b) of a capacitance value can be discharged by control of the switches CF1, CF2, and S12. A switch S42 is connected to between the sample-and-hold capacitor Csh1 and the negative side input (−) of the operational amplifier AMP2. As described later, the second switched capacitor circuit 14 can be allowed to operate as an infinite impulse response (IIR) filter by appropriately controlling timings of the switch S42 that controls an input from the sample-and-hold capacitor Csh1, the switches S12, S13, CF1, and CF2, and the switch S43 that controls transmission to a sample-and-hold capacitor Csh2 of a subsequent stage. It is preferable that the capacitance values of the integration capacitors Cs2a and Cs2b are configured to be changed, for example, by register setting. This is because frequency characteristics of the IIR filter are defined by the capacitance values of the integration capacitors Cs2a and Cs2b.

The integration circuit 15 includes an operational amplifier AMP3 in which a positive side input (+) is fixed to a predetermined potential VHSP. An integration capacitor Cs3 and a switch S14 are connected in parallel with each other between a negative side input (−) and an output VOUT3 of the operational amplifier AMP3. A switch S44 is connected to between the sample-and-hold capacitor Csh2 and a negative side input (−) of the operational amplifier AMP3. It is preferable that a capacitance value of the integration capacitor Cs3 is configured to be changed, for example, by resistor setting. This is because in the integration circuit 15, an amplification effect can be obtained by a ratio between the sample-and-hold capacitor Csh2 and the integration capacitor Cs3, and thus a gain can be adjusted by setting the capacitance value of the integration capacitor Cs3 to be variable. In addition, it is preferable that the number of times of operation of the integration circuit 15, that is, the number of times of piling-up is configured to be changed, for example, by resistor setting. This is because the gain can also be adjusted by the number of times of operation of the integration circuit 15.

The sample-and-hold circuit 19 is constituted by the input switch S4, a sample-and-hold capacitor CSH, and a voltage follower amplifier using an operation amplifier AMP4.

The touch detecting circuit 301 can be allowed to selectively operate in at least three operation modes to be described below by appropriately controlling the above-described respective switches. It is preferable that selection of the operation modes is configured to appropriately set a control sequence of the above-described switches by providing the control register (CREG) 320 to the sequence control circuit (SQENC) 308. The control register (CREG) 320 may be configured as a nonvolatile memory element, or may be configured as a volatile memory element to be initialized or appropriately changed by the sub-processor (SMPU) 5 and the like.

In a first operation mode, the first switched capacitor circuit 12 is allowed to operate as an FIR filter, the second switched capacitor circuit 14 is allowed to operate as an IIR filter, and results of the operations are output after being integrated (accumulatively added) in the integration circuit 15. In a second operation mode, the first switched capacitor circuit 12 is allowed to operate as a QV conversion circuit, the second switched capacitor circuit 14 is allowed to operate as the IIR filter, and results of the operations are output after being integrated (accumulatively added) in the integration circuit 15. In a third operation mode, the first switched capacitor circuit 12 is allowed to operate as an integration circuit, and operations of the second switched capacitor circuit 14 and the integration circuit 15 are stopped, and thus the output VOUT1 of the first switched capacitor circuit 12 is output as an output of the touch detecting circuit 301.

According to this, it is possible to programmably set a configuration capable of allowing the touch detecting circuit 301 to perform the most appropriate operation among the above-described configurations thereof or other configurations in accordance with an environment in which the touch panel control circuit 3 is mounted and used, and thus it is possible to cope with various noise environments. Here, the above-described other configurations represent, for example, a case where the second switched capacitor circuit 14 is allowed to operate as the FIR filter other than the IIR filter, and the like. When the switches CF1 and CF2 are closed, at all times, the integration capacitors Cs2a and Cs2b are connected in parallel with each other, and thus the second switched capacitor circuit 14 can be allowed to operate as the FIR filter.

The respective operation modes will be described in more detail.

First Operation Mode (FIR+IIR+Integration Circuit)

In the first operation mode, the first switched capacitor circuit 12 is allowed to operate as the FIR filter, the second switched capacitor circuit 14 is allowed to operate as the IIR filter, and results of the operations are output after being integrated (accumulatively added) in the integration circuit 15.

Figure 11:
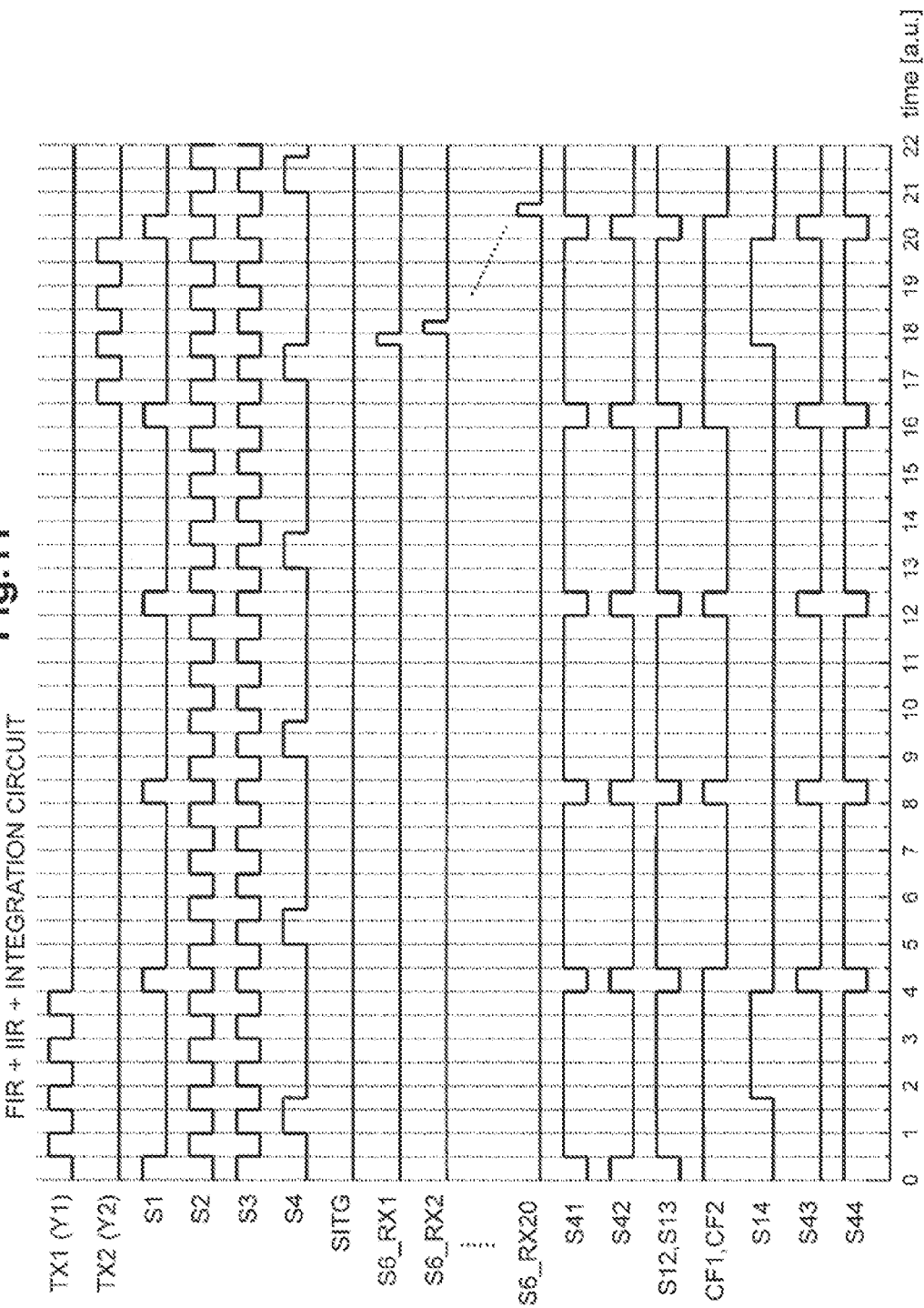
FIG. 11 is a timing chart illustrating a first operation mode (single edge detection type FIR+IIR+integration circuit) of the touch detecting circuit of the fourth embodiment.

FIG. 11 is a timing chart illustrating an operation example of the above-described first operation mode (FIR+IIR+integration circuit). Time is shown on the horizontal axis with an arbitrary unit (a.u.), and signals (TX1 and TX2) for application of pulses to the Y electrodes and signals for on/off control of the above-described respective switches are shown in the vertical axis direction from an upper side thereof. As described above with reference to FIG. 9, a plurality of pulses are intermittently applied to the Y electrodes. FIG. 11 illustrates parts of the plurality of pulses. Four pulses are applied to the electrode Y1 from time t=0.5, and the application is stopped in a display period (not shown) of time t=4 to 15.5. Four pulses are applied to the electrode Y2 from time t=16.5, and the application is stopped in a display period (not shown) after time t=20. As described with reference to FIG. 9, with regard to one Y electrode, a period in which one or a plurality of pulses are applied and a period in which application of the pulses are stopped for display are repetitively shown. However, only four pulse application periods and four pulse stopping periods (display periods) are shown in FIG. 11 in a simple manner. When a pulse is applied to the Y electrode, an electric charge corresponding to the sensor capacitor Cxy is input from the X electrode to the input terminal PX1 of the detection circuit 10_1.

The switch S2 of the first switched capacitor circuit 12 is closed in synchronization with the pulse that is applied to the Y electrode, and the electric charge that is input is transmitted to the integration capacitor Cs1. Whenever the electric charge is transmitted, the electric charge is accumulated in the integration capacitor Cs1, and is output to the VOUT1. The switch S1 discharges the electric charges accumulated in the integration capacitor Cs1 in a periodic manner similar to time t=0 to 0.5, and t=5 to 5.5. The output VOUT1 is retained in the sample-and-hold capacitor Csh1 through the switch S41. As described above, the first switched capacitor circuit 12 operates as a quartic FIR filter, integrates the electric charges which are periodically input to the terminal PX1 in synchronization with the pulse applied to the Y electrode and which correspond to four pulse periods, and outputs the integrated electric charges to the sample-and-hold capacitor Csh1 for every four pulse periods. The operations of the switches S1, S2, S3, and S41 repetitively continue at the same cycle as described above even in the period t=4 to 16 in which application of the pulses to the electrode Y1 is stopped.

The output of the first switched capacitor circuit 12, which is retained in the sample-and-hold capacitor Csh1, is input to the second switched capacitor circuit 14 with the switch S42 for every four pulse periods. At time t=4 to 4.5, all of the switches CF1 and CF2 are closed, and the integration capacitors Cs2a and Cs2b are connected in parallel with each other, and thus the capacitance value becomes a value of Cs2a+Cs2b. The output of the FIR filter, which is input, is accumulated in the integration capacitors Cs2a and Cs2b. At time t=4.5 to 8, the switches CF1 and CF2 are opened in combination with each other, and the switches S12 and S13 are closed. Accordingly, the integration capacitor Cs2b is short-circuited and is discharged, and is initialized with a voltage VHSP. Next, at time t=8 to 8.5, all of the switches CF1 and CF2 are closed again, and the subsequent output of the FIR filter, which is input, is accumulated in the integration capacitors Cs2a and Cs2b. As described above, the second switched capacitor circuit 14 operates as the IIR filter in which electric charges that are retained up to an immediately previous sampling, $Cs2b/(Cs2a+Cs2b)$, are discarded, and newly input sampling data is accumulated in the integration capacitors $Cs2a+Cs2b$. It is possible to adjust frequency characteristics by a ratio $Cs2b/(Cs2a+Cs2b)$ which determines a feedback coefficient of the IIR filter. When the capacitance values of the integration capacitors $Cs2a$ and $Cs2b$ are configured to be changed, for example, by register setting, adjustment of the frequency characteristics is possible. Similarly, the operations of the switches S42, CF1, CF2, S12, and S13 also repetitively continue at the same cycle as described above even in the period t=4 to 16 in which application of the pulses to the electrode Y1 is stopped.

An output of the second switched capacitor circuit 14 that operates as the IIR filter is transmitted to the sample-and-hold capacitor Csh2 by closing the switch S43, and is input to the integration circuit 15 by closing the switch S44. In the integration circuit 15, outputs of the IIR filter, which are input four times at time t=4.5, t=8.5, t=12.5, and t=16.5, are output after being accumulatively added in the integration capacitor Cs3. The output VOUT3 of the integration circuit 15 is transmitted to the sample-and-hold capacitor CSH of the sample-and-hold circuit 19 by closing the switch S4 (time t=17). On the other hand, electric charges accumulated in the integration capacitor Cs3 of the integration circuit 15 are discharged by closing the switch S14 (time t=18), and thus the integration circuit 15 is reset. Similarly, the operations of the switches S43, S44, S14, and S4 repetitively continue at the same cycle as described above, even in the period t=4 to 16 in which application of the pulses to the electrode Y1 is stopped.

When being selected with the switch S6_RX1 of the selector 303 (time t=18), an output retained in the sample-and-hold capacitor CSH is input to the AD conversion circuit 304 through the voltage follower amplifier using the operational amplifier AMP4.

Subsequently, although not shown, the touch detecting circuit 301 repeats the above-described operations with respect to pulses (TX2 to TXM) that are applied to other electrodes Y2 to YM.

Hereinbefore, description has been given to an example in which when 16 pulses are input to the terminal PX1, the first switched capacitor circuit 12 is allowed to operate as a quartic FIR filter that operates for every four pulses, and the second switched capacitor circuit 14 is allowed to operate as a quartic IIR filter that operates for every four pulses, but the order of the FIR filter and the IIR filter can be changed in an arbitrary manner. In addition, it is preferable that the number of times of operation of the integration circuit 15, that is, the number of times of piling-up is configured to be changed, for example, by resistor setting.

A signal charge transmission timing, which is shown in FIG. 11, between the first switched capacitor circuit 12 that operates as an FIR filter, the second switched capacitor circuit 14 that operates as an IIR filter, and the integration circuit 15 is illustrative only, and can be changed in an arbitrary manner. For example, description has been given to an example in which the input to the second switched capacitor circuit 14 and the output therefrom are performed at the same timing, but the timing can be adjusted to increase the time interval from the input to the IIR filter to the output from the IIR filter by retarding the timing of closing the switch S43 in comparison to a timing of closing the switch S42 by several cycles, and the like. In addition, the second switched capacitor circuit 14 is also allowed to operate as an FIR filter by closing the switches CF1 and CF2 at all times.

As described above, in the first operation mode, the first and second switched capacitor circuits 12 and 14 are allowed to operate as an FIR filter and an IIR filter, respectively, and the results thereof are output after being integrated (accumulatively added) in the integration circuit 15. The first and second switched capacitor circuits 12 and 14 which operate as the FIR filter and the IIR filter, and the integration circuit 15 operate in synchronization with a pulse applied to the Y electrodes, and the sampling operation with respect to the X electrodes, and the subsequent filtering operation and integration operation continue at the same cycle even in a period in which application of a pulse to the Y electrodes is stopped. According to this, even in a case where application of a pulse to the Y electrodes is intermittently stopped for every one line cycle for display drive and touch detection, a pass characteristic peak does not appear at a frequency of the reciprocal of the one line cycle, and thus it is possible to further increase the noise suppressing effect due to intrinsic pass characteristics of the FIR filter and the IIR filter.

Second Operation Mode (QV Converter+IIR+Integration Circuit)

In the second operation mode, the first switched capacitor circuit 12 is allowed to operate as a QV conversion circuit, the second switched capacitor circuit 14 is allowed to operate as an IIR filter, and the results thereof are output after being integrated (accumulatively added) in the integration circuit 15.

Figure 12:
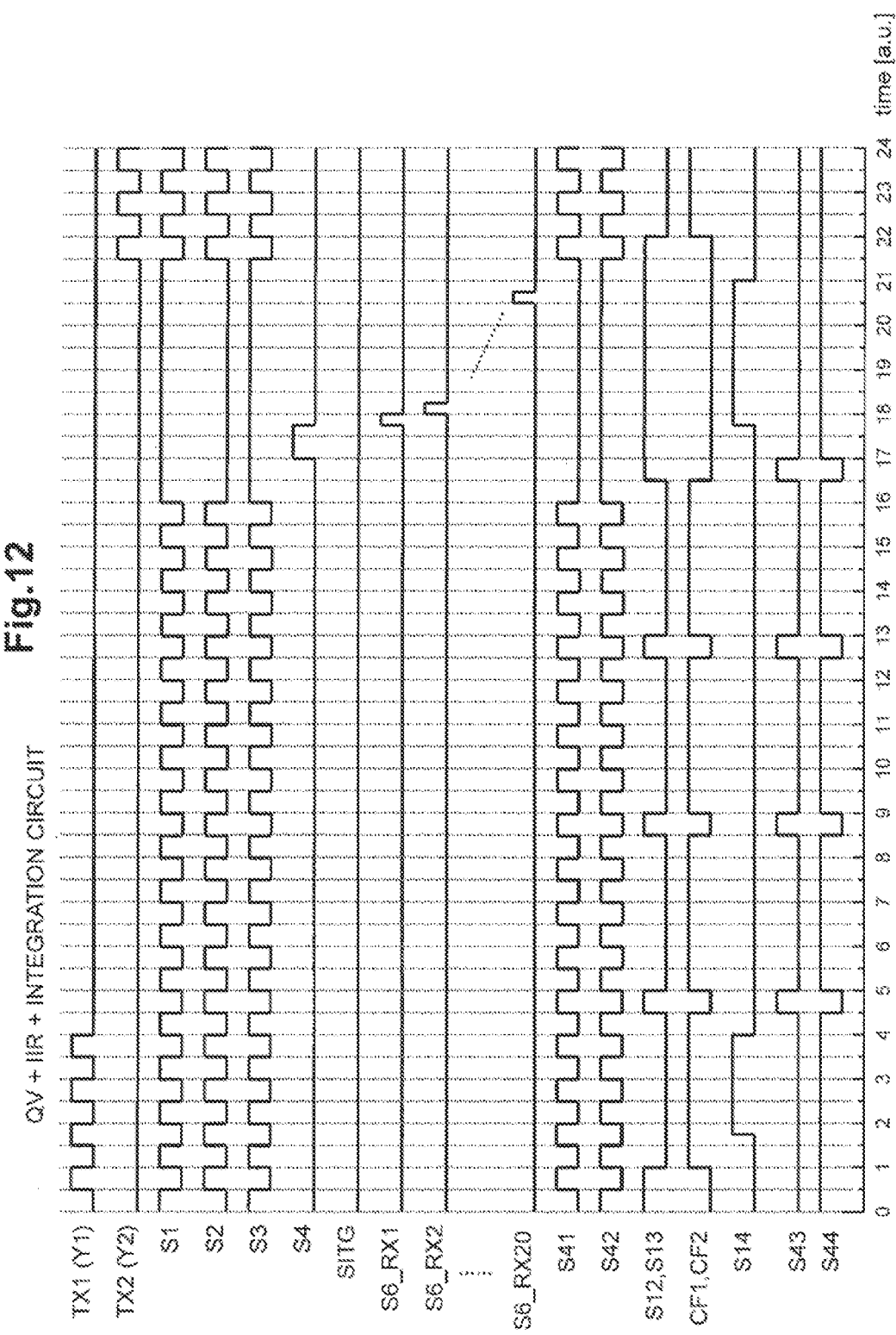
FIG. 12 is a timing chart illustrating a second operation mode (single edge detecting type QV conversion+IIR+integration circuit) of the touch detecting circuit of the fourth embodiment.

FIG. 12 is a timing chart illustrating an operation example of the above-described second operation mode (QV conversion+IIR+Integration Circuit). As is the case with FIG. 11, time is shown on the horizontal axis with an arbitrary unit, and signals (TX1 and TX2) for application of pulses to the Y electrodes and signals for on/off control of the above-described respective switches are shown in the vertical axis direction from an upper side thereof. As is the case with the first operation mode described with reference to FIG. 11, a plurality of pulses are intermittently applied to the Y electrodes. Four pulses are applied to the electrode Y1 from time t=0.5, and the application is stopped in a display period (not shown) at time t=4 to 15.5.

The switch S2 of the first switched capacitor circuit 12 is closed in synchronization with the pulse that is applied to the Y electrode, and the electric charge that is input is transmitted to the integration capacitor Cs1. Whenever the electric charge is transmitted, the electric charge is accumulated in the integration capacitor Cs1, and is output to the VOUT1. The switch S1 periodically discharges the electric charges accumulated in the integration capacitor Cs1 at a phase opposite to that of the switch S2. The output VOUT1 is retained in the sample-and-hold capacitor Csh1 through the switch S41. Differently from the operation as the FIR filter which is described with reference to FIG. 11, a signal charge corresponding to one pulse that is input to the Y electrode is output to VOUT1 as is without being accumulated, and is transmitted to the sample-and-hold capacitor Csh1 and is retained therein. The first switched capacitor circuit 12 operates as a QV conversion circuit that converts an electric charge Q, which is input, to a voltage V. The first switched capacitor circuit 12 periodically converts an electric charge input to the terminal PX1 to a voltage VOUT in synchronization with a pulse that is applied to the Y electrode, and outputs the converted voltage to the sample-and-hold capacitor Csh1 for every one pulse. The operations of the switches S1, S2, S3, and S41 repetitively continue at the same cycle as described above even in the period t=4 to 16 in which application of a pulse to the electrode Y1 is stopped.

An output of the first switched capacitor circuit 12, which is retained in the sample-and-hold capacitor Csh1, is input to the second switched capacitor circuit 14 with the switch S42 for every one pulse. A signal charge that is input to the second switched capacitor circuit 14 is accumulated for every four inputs in the integration capacitors Cs2a and Cs2b which are connected in parallel with each other because the switches CF1 and CF2 are closed, and Cs2b/(Cs2a+Cs2b) is discarded at time t=4.5 to 5, t=8.5 to 9, t=12.5 to 13, . . . . As described above, the second switched capacitor circuit 14 operates as the IIR filter. Similarly, the operations of the switches S42, CF1, CF2, S12, and S13 repetitively continue at the same cycle as described above even in the period t=4 to 16 in which application of a pulse to the electrode Y1 is stopped.

An output of the second switched capacitor circuit 14 that operates as the IIR filter is transmitted to the sample-and-hold capacitor Csh2 by closing the switch S43, and is input to the integration circuit 15 by closing the switch S44. In the integration circuit 15, outputs of the IIR filter, which are input four times at time t=4.5, t=8.5, t=12.5, and t=16.5, are accumulated in the integration capacitor Cs3 and are output. The output VOUT3 of the integration circuit 15 is transmitted to the sample-and-hold capacitor CSH of the sample-and-hold circuit 19 by closing the switch S4 (time t=17). On the other hand, electric charges accumulated in the integration capacitor Cs3 of the integration circuit 15 are discharged by closing the switch S14 (time t=18 to 21), and thus the integration circuit 15 is reset.

When being selected with the switch S6_RX1 of the selector 303 (time t=18), an output retained in the sample-and-hold capacitor CSH is input to the AD conversion circuit 304 through the voltage follower amplifier using the operational amplifier AMP4.

Subsequently, although not shown, the touch detecting circuit 301 repeats the above-described operations with respect to pulses (TX2 to TXM) that are applied to other electrodes Y2 to YM.

Hereinbefore, description has been given to an example in which when four pulses are input to the terminal PX1, the first switched capacitor circuit 12 is allowed to operate as a QV conversion circuit that operates for every one pulse, and the second switched capacitor circuit 14 is allowed to operate as an IIR filter that operates for every four pulses. However, the order of the IIR filter can be changed in an arbitrary manner.

As described above, in the second operation mode, the first and second switched capacitor circuits 12 and 14 are allowed to operate as a QV conversion circuit and an IIR filter, respectively, and the results thereof are output after being integrated (accumulatively added) in the integration circuit 15. The first and second switched capacitor circuits 12 and 14 which operate as the QV conversion circuit and the IIR filter, and the integration circuit 15 operate in synchronization with a pulse applied to the Y electrodes, and the sampling operation with respect to the X electrodes, and the subsequent filtering operation and integration operation continue at the same cycle even in a period in which application of a pulse to the Y electrodes is stopped. According to this, even in a case where application of a pulse to the Y electrodes is intermittently stopped for every one line cycle for display drive and touch detection, a pass characteristic peak does not appear at a frequency of the reciprocal of the one line cycle, and thus it is possible to further increase the noise suppressing effect due to intrinsic pass characteristics of the QV conversion circuit and the IIR filter.

Third Operation Mode (only Integration Circuit)

In a third operation mode, the first switched capacitor circuit 12 is allowed to operate as an integration circuit, and operations of the second switched capacitor circuit 14 and the integration circuit 15 are stopped, and thus the output VOUT1 of the first switched capacitor circuit 12 is output as an output of the touch detecting circuit 301.

Figure 13:
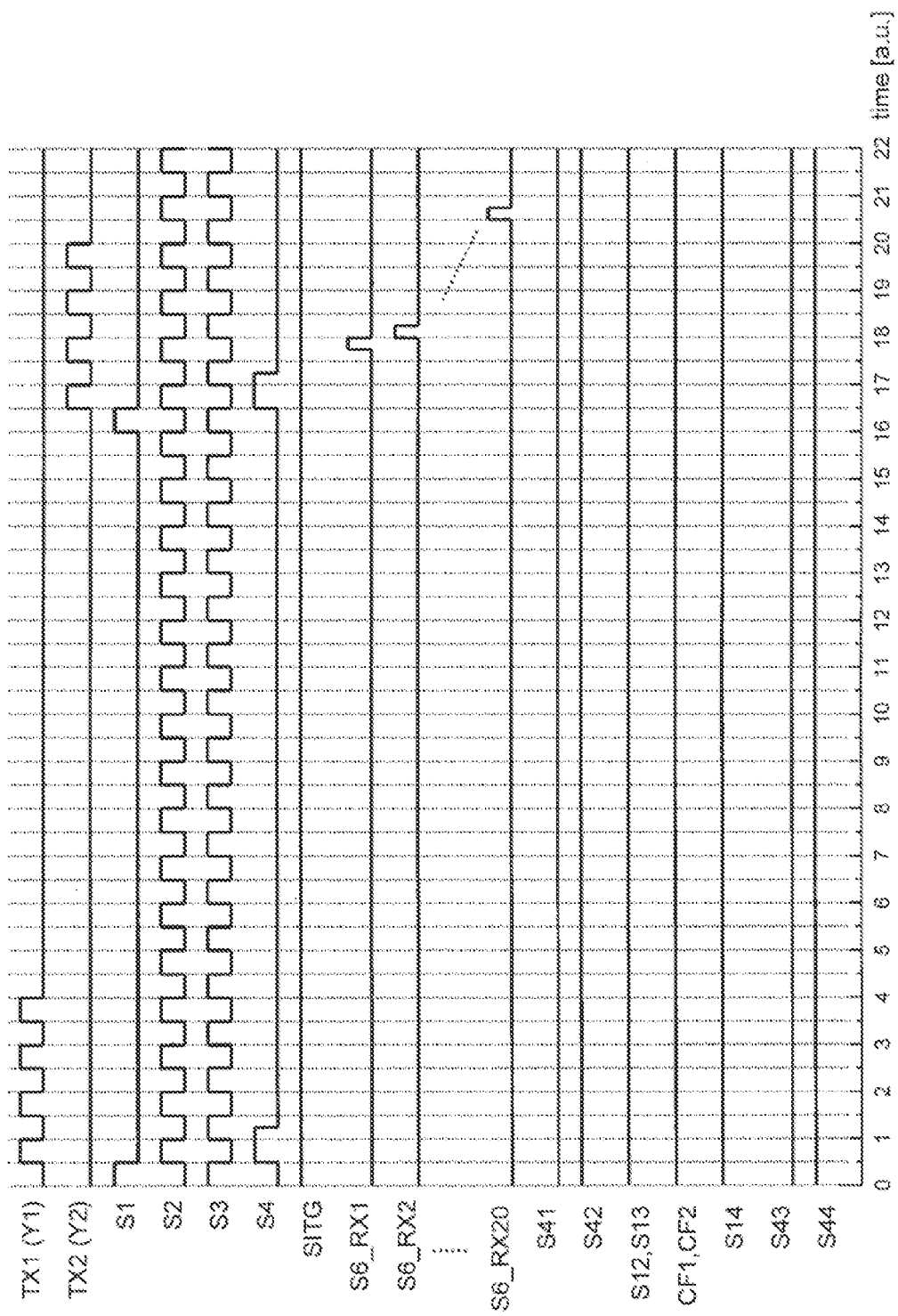
FIG. 13 is a timing chart illustrating a third operation mode (only a single edge detection type integration circuit) of the touch detecting circuit of the fourth embodiment.

FIG. 13 is a timing chart illustrating an operation example of the third operation mode (only an integration circuit). As is the case with FIGS. 11 and 12, time is shown on the horizontal axis with an arbitrary unit (a.u.), and signals (TX1 and TX2) for the application of pulses to the Y electrodes and signals for on/off control of the above-described respective switches are shown in the vertical axis direction from an upper side thereof. As is the case with the first operation mode described with reference to FIG. 11, a plurality of pulses are intermittently applied to the Y electrodes. Four pulses are applied to the electrode Y1 from time t=0.5, and the application is stopped in a display period (not shown) of time t=4 to 15.5.

The switch S2 of the first switched capacitor circuit 12 is closed in synchronization with the pulse that is applied to the Y electrode, and the electric charge that is input is transmitted to the integration capacitor Cs1. Whenever the electric charge is transmitted, the electric charge is accumulatively added in the integration capacitor Cs1, and is output to the VOUT1. The switch S2 repetitively continues at the same cycle even in a period t=4 to 16 in which application of a pulse to the electrode Y1 is stopped. The switch S1 discharges the electric charges accumulated in the integration capacitor Cs1 in a periodic manner similar to that in time t=0 to 0.5 and t=16 to 16.5. The output VOUT1 is retained in the sample-and-hold capacitor CSH through the switch SITG and the switch S4. The operations of the second switched capacitor circuit 14 and the integration circuit 15 are stopped, and particularly, an output of the operational amplifier AMPS of the integration circuit 15 is controlled to high impedance.

As described above, in the third operation mode, the first switched capacitor circuit 12 is allowed to operate as an integration circuit, and is directly connected to the sample-and-hold circuit 19 by by-passing the second switched capacitor circuit 14 and the integration circuit 15. A configuration, in which only the integration circuit 15 is allowed to operate in a state in which the first switched capacitor circuit 12 and the second switched capacitor circuit 14 are by-passed, may be employed. The first switched capacitor circuit 12, which operates as an integration circuit, operates in synchronization with a pulse that is applied to the Y electrodes, and the sampling with respect to the X electrodes and the integration operation continue at the same cycle even in a period in which application of a pulse to the Y electrodes is stopped. According to this, even in a case where application of a pulse to the Y electrodes is intermittently stopped for every one line cycle for display drive and touch detection, a pass characteristic peak does not appear at a frequency of the reciprocal of the one line cycle, and thus it is possible to further increase the noise suppressing effect due to intrinsic pass characteristics of the integration circuit.

[Fifth Embodiment] Programmable SCF (Dual Edge Detection Type)

In the fifth embodiment, during rising of the pulse TX1 that is applied to the electrode Y1, an electric charge corresponding to the sensor capacitor Cxy is input from the detection electrode X1, and a variation amount of the sensor capacitor between touch and non-touch is detected on the basis of the signal charge. In contrast, in the fifth embodiment, electric charge migration, which occurs at a rising edge and a falling edge of the pulse TX1 that is applied to the Y1 electrode, is detected to detect an amount of variation of the sensor capacitor between touch and non-touch.

Figure 14:
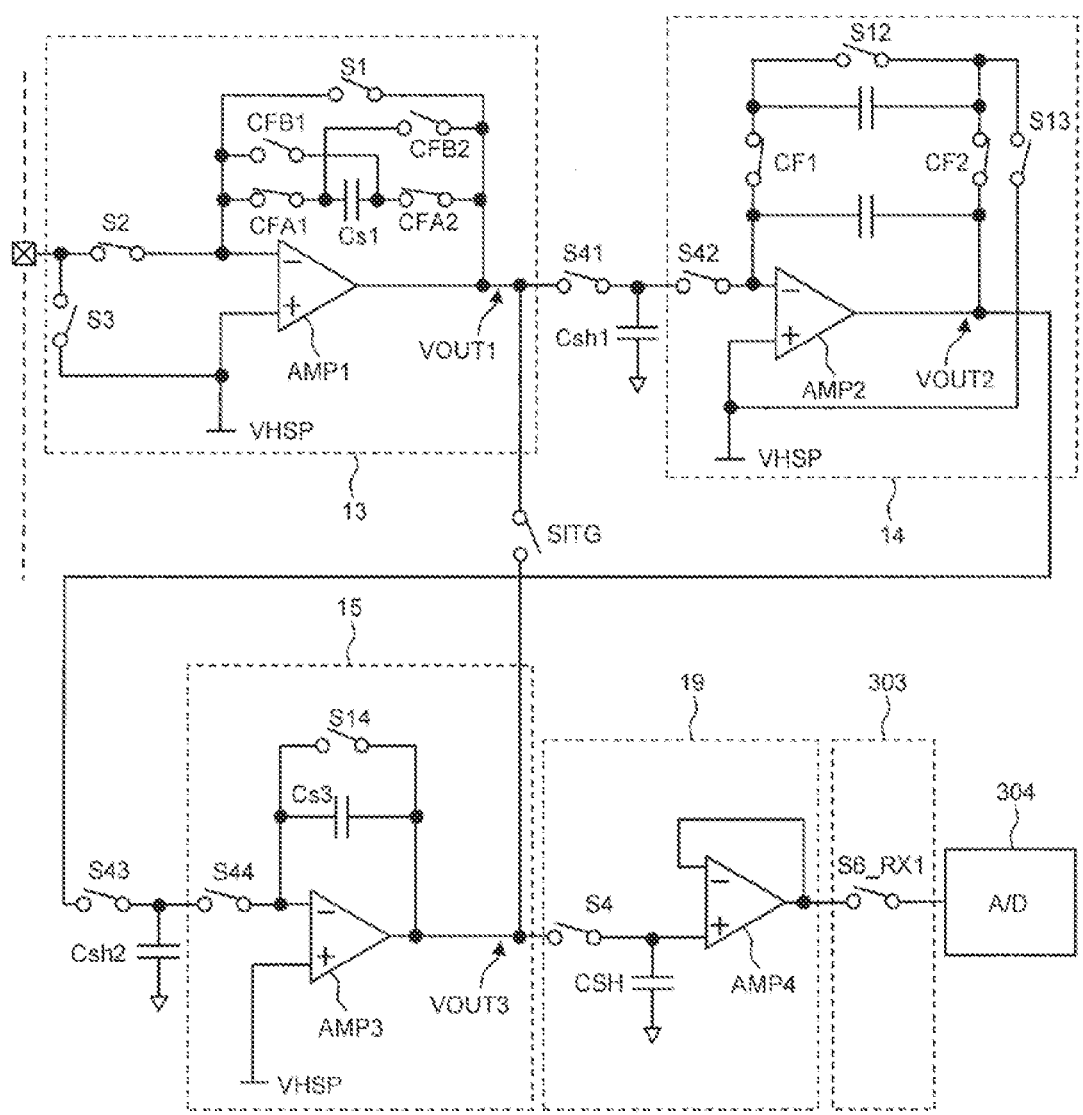
FIG. 14 is a circuit diagram illustrating a configuration example and a connection example of a touch detecting circuit (dual edge detection type) of a fifth embodiment.

FIG. 14 is a circuit diagram illustrating a configuration example and a connection example of a touch detecting circuit (dual edge detection type) of a fifth embodiment. As is the case with FIG. 10, FIG. 14 illustrates an example of a configuration of a circuit, which is connected to one of the detection electrodes (X electrodes), among the touch detecting circuit 301, the sample-and-hold circuit 302, and the selector 303. For example, the circuit is connected to the detection electrode (X electrode) X1 through a terminal PX1. A detection circuit 10 that is connected to one detection electrode (X1) includes first and second switched capacitor circuits 13 and 14, and an integration circuit 15. Differently from the first switched capacitor circuit 12 shown in FIG. 10, the first switched capacitor circuit 13 of a first stage is a switched capacitor circuit capable of detecting migration of an electric charge which occurs at both of the rising edge and the falling edge of the pulse TX1 that is applied to the Y1 electrode. The detection circuit 10 constituted by the first and second switched capacitor circuits 13 and 14, and the integration circuit 15 may be used, for example, as the detection circuits 10_1 to 10_n which are connected to the terminals PX1 to PXn in the touch panel controller 3 of the first embodiment shown in FIG. 5. In addition, the integration circuit 15 can substitute for the integration circuits 11_1 to 11_n in the touch panel controller 3 of the second embodiment shown in FIG. 6.

An input of a first switched capacitor circuit 13 is connected to the detection electrode (X electrode) X1 through the terminal PX1, and an output is transmitted to a second switched capacitor circuit 14 through a switch S41 and a sample-and-hold capacitor Csh1. An output of the second switched capacitor circuit 14 is transmitted to an integration circuit 15 through a switch S43 and a sample-and-hold capacitor Csh2. An output of the integration circuit 15 is connected to one sample-and-hold circuit 19, which constitutes the sample-and-hold circuit 302, through a switch S4. An output of the sample-and-hold circuit 19 is connected to the AD conversion circuit 304 through one switch S6_RX1 that constitutes the selector 303. An output of the first switched capacitor circuit 13 is connected to the switch S4, which is an input of the sample-and-hold circuit 19, through a switch SITG. The above-described respective switches, and respective switches, which are described later, in the first and second switched capacitor circuits 13 and 14 and the integration circuit 15 are controlled by the control signals Csig2 to Csig4 that are output from the sequence control circuit 308.

The first switched capacitor circuit 13 includes an operational amplifier AMP1 in which a positive side input (+) is fixed to a predetermined potential VHSP. The integration capacitor Cs1 and the switch S1 are connected in parallel with each other between a negative side input (−) and an output VOUT1 of the operational amplifier AMP1. Switches CFA1, CFA2, CFB1, and CFB2 are connected to both ends of the integration capacitor Cs1, and have a configuration in which a connection relationship of the integration capacitor Cs1 with respect to the operational amplifier AMP1 can be inverted. That is, the connection relationship of the integration capacitor Cs1 with respect to the operational amplifier AMP1 can be inverted between a state in which the switches CFA1 and CFA2 are closed and the switches CFB1 and CFB2 are opened, and a state in which the switches CFA1 and CFA2 are opened and the switches CFB1 and CFB2 are closed. The other configurations are the same as those of the first switched capacitor circuit 12 shown in FIG. 10. A switch S2 is connected to between the input terminal PX1 and the negative side input (−) of the operational amplifier AMP1, and the input terminal PX1 may be fixed to a predetermined potential VHSP with a switch S3.

As described later, the first switched capacitor circuit 13 can be allowed to operate as an FIR filter, a QV converter, or an integration circuit by appropriately controlling the timings of the switches S1 to S3, the switches CFA1, CFA2, CFB1, and CFB2, and the switch S41 that controls transmission to a sample-and-hold capacitor Csh1 of a subsequent stage.

The second switched capacitor circuit 14 and the integration circuit 15 are configured similar to FIG. 10, and description thereof will not be repeated.

The touch detecting circuit 301 can be allowed to selectively operate in a total of six operation modes further including three operation modes in addition to the three operation modes described in the fourth embodiment. As is the case with description in the fourth embodiment, it is suitable that selection of the operation modes is configured to appropriately set a control sequence of the above-described switches by providing the control register (CREG) 320 for the sequence control circuit (SQENC) 308.

In the first to third operation modes, the first switched capacitor circuit 13 is allowed to operate as an FIR filter, a QV conversion circuit, or an integration circuit of the single edge detection type as illustrated in the fourth embodiment. For operation of the single edge detection type, for example, a state, in which the switches CFA1 and CFA2 are closed and the switches CFB1 and CFB2 are opened, is fixed, and then operation may be allowed in the same operation modes illustrated in the fourth embodiment.

In correspondence with this, in the fourth to sixth operation modes, the first switched capacitor circuit 13 is allowed to operate as an FIR filter, a QV conversion circuit, or an integration circuit of a dual edge detection type. A period, for which the switch S2 is closed, is provided at a rising edge and a falling edge of the pulse TX1 that is applied to the electrode Y1, and the connection relationship of the integration capacitor Cs1 with respect to the operational amplifier AMP1 is inverted between a rising period and a falling period. During rising and falling of the pulse TX1, a migration direction of a signal charge that is generated is inverted. Accordingly, when the polarity of an integration capacitor is inverted in accordance with the inversion of the migration direction, it is possible to detect a signal charge at both the rising edge and the falling edge of the pulse TX1. In the fourth to sixth operation modes, the amount of signal charges that is detected can be doubled, and thus it is possible to improve touch detection sensitivity.

The fourth to sixth operation modes of the dual edge detection type will be described in more detail.

Fourth Operation Mode (Dual Edge Detection Type FIR+ IIR+Integration Circuit)

In the fourth operation mode, as is the case with the first operation mode, the first switched capacitor circuit 13 is allowed to operate as an FIR filter, the second switched capacitor circuit 14 is allowed to operate as an IIR filter, and the results thereof are output after being integrated (accumulatively added) in the integration circuit 15. However, the first switched capacitor circuit 13 of a first stage is allowed to operate as an FIR filter of a dual edge detection type.

Figure 15:
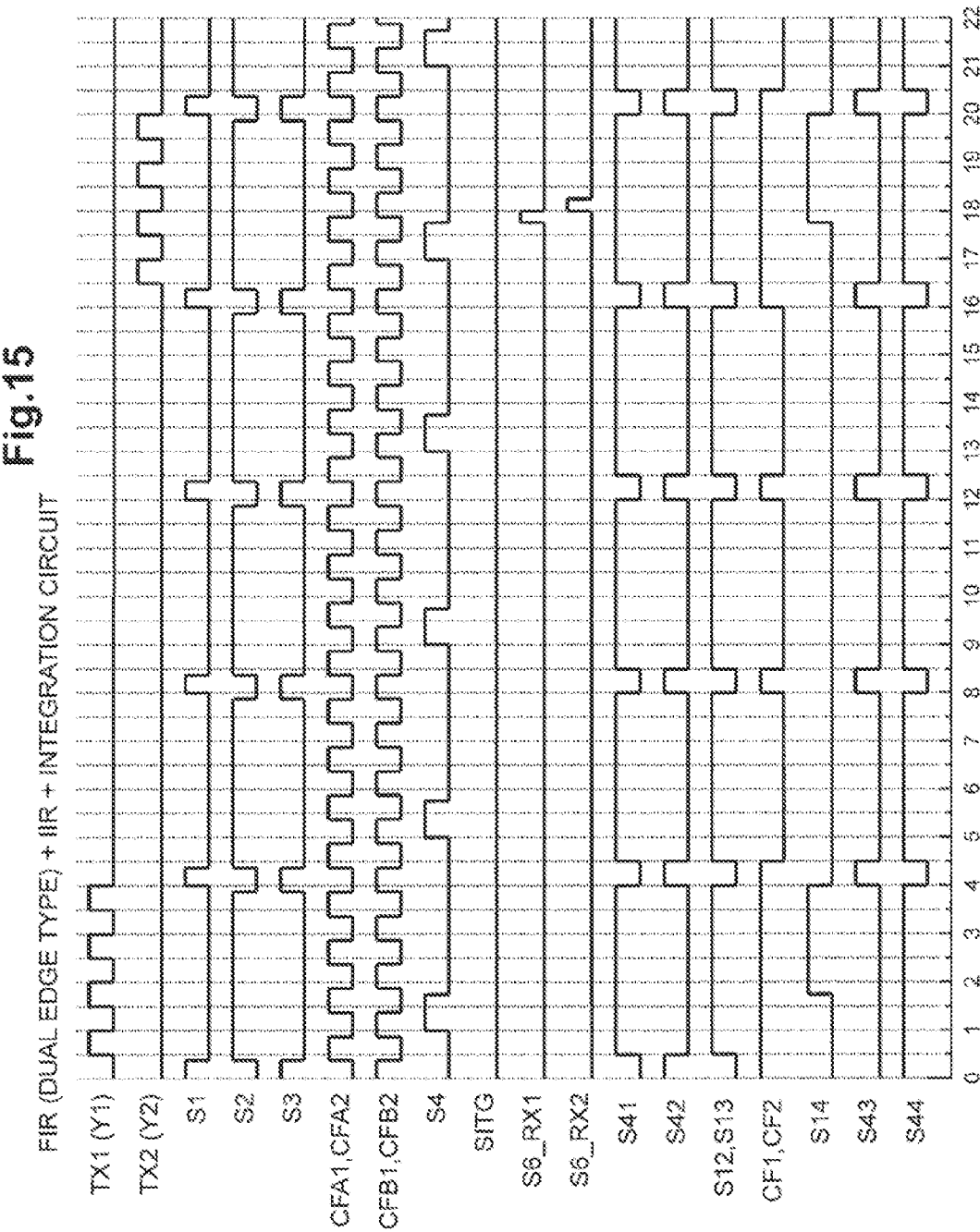
FIG. 15 is a timing chart illustrating a fourth operation mode (dual edge detection type FIR+IIR+integration circuit) of the touch detecting circuit of the fifth embodiment.

FIG. 15 is a timing chart illustrating an operation example of the fourth operation mode (dual edge detection type FIR+IIR+integration circuit). Time is shown on the horizontal axis with an arbitrary unit (a.u.), and signals (TX1 and TX2) for application of pulses to the Y electrodes and signals for on/off control of respective switches including the above-described switches CFA1, CFA2, CFB1, and CFB2 are shown in the vertical axis direction from an upper side thereof. As is the case with the respective operation modes in the fourth embodiment described with reference to FIGS. 11 to 13, a plurality of pulses are intermittently applied to the Y electrodes. That is, four pulses are applied to the electrode Y1 from time t=0.5, and the application is stopped at a display period (not shown) of time t=4 to 15.5. When a pulse is applied to the Y electrode, an electric charge corresponding to the sensor capacitor Cxy is input from the X electrode to the input terminal PX1 of the detection circuit 10_1. Here, the dual edge detection type circuit uses a configuration in which migration of the electric charge occurs at each of a rising edge and a falling edge of the pulse that is applied to the Y electrode, and migration directions thereof are opposite to each other.

Before the rising edge of the pulse is applied to the Y electrode (at time t=0.5−α), the switch S2 of the first switched capacitor circuit 13 is closed, the switches CFA1 and CFA2 are closed, and the switches CFB1 and CFB2 are opened. At time t=0.5, a signal charge, which occurs in accordance with the rising of the pulse that is applied to the Y electrode and which is input from the X electrode, is transmitted to the integration capacitor Cs1. Next, before the falling edge of the pulse is applied to the Y electrode (at time t=1.0−α), the switches CFA1 and CFA2 are opened, and the switches CFB1 and CFB2 are closed, and thus a connection relationship of the integration capacitor Cs1 with respect to the operational amplifier AMP1 is inverted. It can be said that the polarity of the integration capacitor Cs1 is inverted. At time t=1.0, a signal charge, which occurs in accordance with the falling of the pulse that is applied to the Y electrode, and which is input from the X electrode, is transmitted to the integration capacitor Cs1 that is inverted. Subsequently, control of closing the switches CFA1 and CFA2 and opening the switches CFB1 and CFB2 in synchronization with a rising edge (time t=1.5, 2.5, 3.5) of a pulse that is applied to the Y electrode (before the edge), and control of opening the switches CFA1 and CFA2 and closing the switches CFB1 and CFB2 in synchronization with a falling edge (time t=2, 3, 4) (before the edge) of the pulse are repeated in the same manner. A migration direction of a signal charge, which occurs in accordance with the rising and falling of the pulse applied to the Y electrode and which is input from the X electrode, is inverted between the rising and falling thereof. A signal charge that is input from the X electrode is detected at both edges of the pulse, and is accumulatively added to the integration capacitor Cs1 as an absolute value. The switch S41 is closed for a period of time t=0.5 to 4, and the output VOUT1 is transmitted to the sample-and-hold capacitor Csh1. An output of the first switched capacitor circuit 13, which is retained in the sample-and-hold capacitor Csh1, is input to the second switched capacitor circuit 14 at time t=4 with the switch S42. Electric charges that are accumulated in the integration capacitor Cs1 are transmitted to the sample-and-hold capacitor Csh1, and then are discharged and initialized with the switch S1. Subsequently, the first switched capacitor circuit 13 operates as an FIR filter that integrates electric charges input to the terminal PX1, which correspond to four pulse periods at the same cycle as the above-described sequence even in a period t=4 to 16 in which application of a pulse to the electrode Y1 is stopped, and outputs the integrated electric charges to the sample-and-hold capacitor Csh1 for every four pulse periods.

Operations of the second switched capacitor circuit 14 and the integration circuit 15 of subsequent stages are the same as the first operation mode (single edge detection type FIR+IIR+integration circuit) described with reference to FIG. 11 in the fourth embodiment, and thus description thereof will not be repeated.

As described above, in the fourth operation mode (dual edge detection type FIR+IIR+integration circuit), the first and second switched capacitor circuits 13 and 14 are allowed to operate as an FIR filter and an IIR filter, respectively, and results thereof are output after being integrated (accumulatively added) in the integration circuit 15. An amount of signal charges that are input to the FIR filter of the first stage can be doubled in comparison to the first operation mode, and thus it is possible to improve touch detection sensitivity. In addition, even in a period in which application of a pulse to the Y electrodes is stopped, the sampling operation with respect to the X electrodes and the subsequent filtering operation and integration operation continue at the same cycle. According to this, even in a case where application of a pulse to the Y electrodes is intermittently stopped for every one line cycle for display drive and touch detection, a pass characteristic peak does not appear at a frequency of the reciprocal of the one line cycle, and thus it is possible to further increase the noise suppressing effect due to intrinsic pass characteristics of the FIR filter and the IIR filter.

Fifth Operation Mode (Dual Edge Detection Type QV Conversion+IIR+Integration Circuit)

In the fifth operation mode, as is the case with the second operation mode, the first switched capacitor circuit 13 is allowed to operate as a QV conversion circuit, the second switched capacitor circuit 14 is allowed to operate as an IIR filter, and the results thereof are output after being integrated (accumulatively added) in the integration circuit 15. However, the first switched capacitor circuit 13 of the first stage is allowed to operate as a QV conversion circuit of a dual edge detection type.

Figure 16:
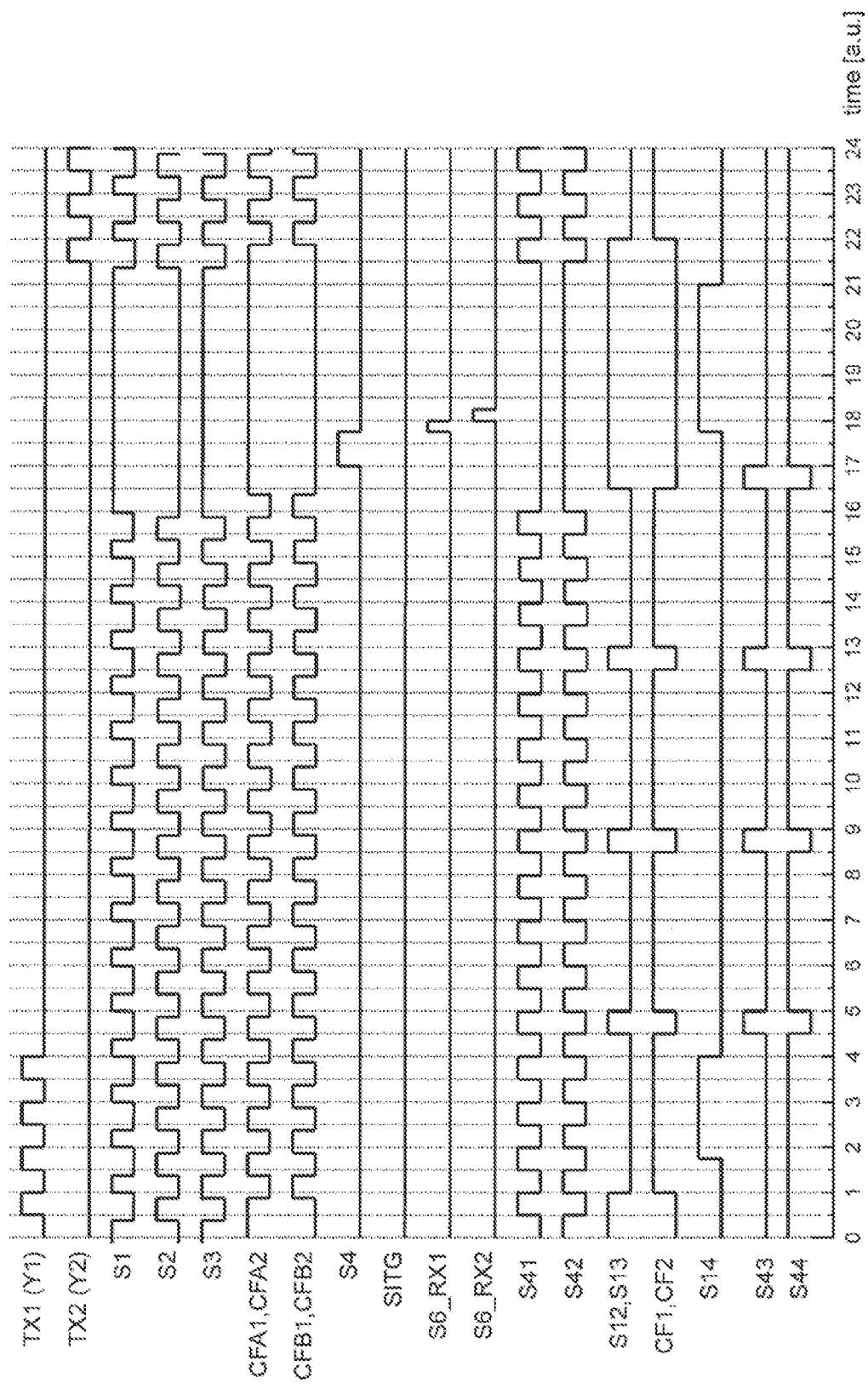
FIG. 16 is a timing chart illustrating a fifth operation mode (dual edge detection type QV conversion+IIR+integration circuit) of the touch detecting circuit of the fifth embodiment.

FIG. 16 is a timing chart illustrating an operation example of the fifth operation mode (dual edge detection type QV conversion+IIR+integration circuit). As is the case with FIG. 15, time is shown on the horizontal axis with an arbitrary unit (a.u.), and signals (TX1 and TX2) for application of pulses to the Y electrodes and signals for on/off control of respective switches including the above-described switches CFA1, CFA2, CFB1, and CFB2 are shown in the vertical axis direction from an upper side thereof. As is the case with the fourth operation mode described with reference to FIG. 15, a plurality of pulses are intermittently applied to the Y electrodes. That is, four pulses are applied to the electrode Y1 from time t=0.5, and the application is stopped in a display period (not shown) of time t=4 to 15.5. When a pulse is applied to the Y electrode, an electric charge corresponding to the sensor capacitor Cxy is input from the X electrode to the input terminal PX1 of the detection circuit 10_1. Here, since the fifth operation mode also uses a dual edge detection type circuit, the fifth operation mode uses a configuration in which migration of the electric charge occurs at each of a rising edge and a falling edge of the pulse that is applied to the Y electrode, and the migration directions thereof are opposite to each other.

Before the rising edge (time t=0.5) of the pulse is applied to the Y electrode, the switch S2 of the first switched capacitor circuit 13 is closed, the switches CFA1 and CFA2 are closed, and the switches CFB1 and CFB2 are opened. At time t=0.5, a signal charge, which occurs in accordance with the rising of the pulse that is applied to the Y electrode and which is input from the X electrode, is transmitted to the integration capacitor Cs1. Next, before the falling edge (time t=1.0) of the pulse is applied to the Y electrode, the switches CFA1 and CFA2 are opened, and the switches CFB1 and CFB2 are closed, and thus a connection relationship of the integration capacitor Cs1 with respect to the operational amplifier AMP1 is inverted (a polarity of an integration capacitor Cs1 is inverted). At time t=1.0, a signal charge, which occurs in accordance with the falling of the pulse that is applied to the Y electrode, and which is input from the X electrode, is transmitted to the integration capacitor Cs1 that is inverted, is accumulatively added to the electric charge that is transmitted at the rising edge, and the added electric charges are output to VOUT1. The switch S1 periodically discharges the electric charges accumulated in the integration capacitor Cs1 at a phase opposite to that of the switch S2. The output VOUT1 is retained in the sample-and-hold capacitor Csh1 through the switch S41. Differently from the operation as the FIR filter described with reference to FIG. 15, a signal charge, which is input to the Y electrodes and corresponds to one pulse, is not accumulated over a plurality of sampling periods, and a signal charge that is sampled twice in synchronization with a rising timing and a falling timing of one sampling period is added having polarities opposite to each other, and is output to VOUT1. As described above, the first switched capacitor circuit 13 operates as a QV conversion circuit that converts an electric charge Q, which is input, to a voltage V. The first switched capacitor circuit 13 periodically converts an electric charge input to the terminal PX1 to a voltage VOUT in synchronization with a pulse that is applied to the Y electrode, and outputs the converted voltage to the sample-and-hold capacitor Csh1 for every one pulse. The operations of the switches S1, S2, S3, and S41 repetitively continue at the same cycle even in a period t=4 to 16 in which application of a pulse to the Y electrode is stopped.

Operations of the second switched capacitor circuit 14 and the integration circuit 15 of subsequent stages are the same as the second operation mode (single edge detection type QV conversion+IIR+integration circuit) described with reference to FIG. 12 in the fourth embodiment, and thus a description thereof will not be repeated.

As described above, in the fifth operation mode (dual edge detection type QV conversion+IIR+integration circuit), the first and the second switched capacitor circuits 13 and 14 are allowed to operate as a QV conversion circuit and an IIR filter, respectively, and results thereof are output after being integrated (accumulatively added) in the integration circuit 15. An amount of signal charges that are input to the FIR filter of the first stage can be doubled in comparison to the second operation mode, and thus it is possible to improve touch detection sensitivity. In addition, even in a period in which application of a pulse to the Y electrodes is stopped, the sampling operation with respect to the X electrodes and the subsequent filtering operation and integration operation continue at the same cycle. According to this, even in a case where application of a pulse to the Y electrodes is intermittently stopped for every one line cycle for display drive and touch detection, a pass characteristic peak does not appear at a frequency of the reciprocal of the one line cycle, and thus it is possible to further increase the noise suppressing effect due to intrinsic pass characteristics of the QV conversion circuit and the IIR filter.

Sixth Operation Mode (Only Dual Edge Detection Type Integration Circuit)

In the sixth operation mode, as is the case with the third operation mode, the first switched capacitor circuit 13 is allowed to operate as an integration circuit, and operations of the second switched capacitor circuit 14 and the integration circuit 15 are stopped, and thus the output VOUT1 of the first switched capacitor circuit 13 is output as an output of the touch detecting circuit 301. However, the first switched capacitor circuit 13 is allowed to operate as a dual edge detection type integration circuit.

FIG. 17 is a timing chart illustrating an operation example of a sixth operation mode (only dual edge detection type integration circuit). As is the case with FIGS. 15 and 16, time is shown on the horizontal axis with an arbitrary unit (a.u.), and signals (TX1 and TX2) for application of pulses to the Y electrodes and signals for on/off control of respective switches including the above-described switches CFA1, CFA2, CFB1, and CFB2 are shown in the vertical axis direction from an upper side thereof. As is the case with the fourth and fifth operation modes described with reference to FIGS. 15 and 16, a plurality of pulses are intermittently applied to the Y electrodes. That is, four pulses are applied to the electrode Y1 from time t=0.5, and the application is stopped in a display period (not shown) of time t=4 to 15.5. When a pulse is applied to the Y electrode, an electric charge corresponding to the sensor capacitor Cxy is input from the X electrode to the input terminal PX1 of the detection circuit 10_1. Here, since the sixth operation mode is also a dual edge detection type, the sixth operation mode also uses a configuration in which migration of the electric charge occurs at each of a rising edge and a falling edge of the pulse that is applied to the Y electrode, and migration directions thereof are opposite to each other.

Before the rising edge of the pulse that is applied to the Y electrode (at time t=0.5−α), the switch S2 of the first switched capacitor circuit 13 is closed, the switches CFA1 and CFA2 are closed, and the switches CFB1 and CFB2 are opened. At time t=0.5, a signal charge, which occurs in accordance with the rising of the pulse that is applied to the Y electrode and which is input from the X electrode, is transmitted to the integration capacitor Cs1. Next, before the falling edge of the pulse that is applied to the Y electrode (at time t=1.0−α), the switches CFA1 and CFA2 are opened, and the switches CFB1 and CFB2 are closed, and thus a connection relationship of the integration capacitor Cs1 with respect to the operational amplifier AMP1 is inverted (a polarity of an integration capacitor Cs1 is inverted). At time t=1.0, a signal charge, which occurs in accordance with the falling of the pulse that is applied to the Y electrode, and which is input from the X electrode, is transmitted to the integration capacitor Cs1 that is inverted, and is accumulatively added to the electric charge that is transmitted at the rising edge. Subsequently, control of closing the switches CFA1 and CFA2 and opening the switches CFB1 and CFB2 in synchronization with a rising edge (time t=1.5, 2.5, 3.5, 4.5) of a pulse that is applied to the Y electrode (before the edge), and control of opening the switches CFA1 and CFA2 and closing the switches CFB1 and CFB2 in synchronization with a falling edge (time t=2, 3, 4, 5) (before the edge) of the pulse are repeated in the same manner. A migration direction of a signal charge, which occurs in accordance with the rising and falling of the pulse applied to the Y electrode and which is input from the X electrode, is inverted between the rising and falling thereof. A signal charge that is input from the X electrode is detected at both edges of the pulse, is accumulatively added to the integration capacitor Cs1 as an absolute value, and is output to VOUT1. The operations of the switch S2, the switches CFA1 and CFA2, and the switches CFB1 and CFB2 repetitively continue at the same cycle as described above even in the period of t=4 to 16 in which application of a pulse to the Y electrodes is stopped. The switch S1 periodically discharges electric charges that are accumulated in the integration capacitor Cs1 at a phase opposite that of the switch S2. The output VOUT1 is retained in the sample-and-hold capacitor CSH with the switch SITG and the switch S4. Operations of the second switched capacitor circuit 14 and the integration circuit 15 are stopped, and particularly, an output of the operational amplifier AMPS of the integration circuit 15 is controlled to high impedance.

As described above, in the sixth operation mode (only dual edge detection type integration circuit), as is the case with the third operation mode, the first switched capacitor circuit 13 is allowed to operate as an integration circuit, and is directly connected to the sample-and-hold circuit 19 by by-passing the second switched capacitor circuit 14 and the integration circuit 15. In the sixth operation mode, an amount of signal charges, which are input to the first switched capacitor circuit 13 that operates as the integration circuit, can be doubled in comparison to the third operation mode, and thus it is possible to improve touch detection sensitivity. In addition, the sampling with respect to the X electrodes and the integration operation continue at the same cycle even in a period in which application of a pulse to the Y electrodes is stopped. According to this, even in a case where application of a pulse to the Y electrodes is intermittently stopped for every one line cycle for display drive and touch detection, a pass characteristic peak does not appear at a frequency of the reciprocal of the one line cycle, and thus it is possible to further increase the noise suppressing effect due to intrinsic pass characteristics of the integration circuit.

Hereinbefore, the invention has been described in detail with reference to the embodiments, but the invention is not limited thereto, and various modifications can be made in a range not departing from the gist of the invention.

For example, in the first to fifth embodiments, description has been given to an embodiment in which the invention is mainly applied to the mutual-capacitance type touch detecting circuit, but the invention may be applied to the self-capacitance type touch detecting circuit. The display panel (DP) 2 may be a liquid crystal display panel, an organic EL display panel, and other display panels of arbitrary types. In addition, the liquid crystal display panel may be either an amorphous silicon type liquid crystal display panel or a low-temperature poly-silicon type liquid crystal display panel.

What is claimed is:

1. A touch panel controller configured to be coupled to a plurality of sensor capacitors arranged on a touch panel through an interconnection, the touch panel controller comprising:
    a terminal configured to connect to the interconnection; and
    circuit elements configured to:
        detect capacitance values of the plurality of sensor capacitors by sequentially setting each of the plurality of sensor capacitors as a target capacitor and measuring electric charge of the target capacitor through the terminal; and
        vary a detection characteristic corresponding to the target capacitor based on an interconnection length from the terminal to the target capacitor compensate for variation in interconnection resistances of the plurality of sensor capacitors.

2. The touch panel controller according to claim 1, wherein:
    the circuit elements comprise a touch recognition circuit configured to detect touch or non-touch to the target capacitor based on a threshold value, where the threshold value is adjusted based on the interconnection length.

3. The touch panel controller according to claim 2, wherein the circuit elements comprise:
    a touch drive circuit configured to charge the target capacitor;
    a detection circuit configured to detect electric charge discharged from the target capacitor; and
    an AD conversion circuit configured to convert an output of the detection circuit into a digital value corresponding to a capacitive value of the target capacitor,
    wherein the touch recognition circuit is configured to detect touch coordinates based on a plurality of digital values output from the AD conversion circuit.

4. The touch panel controller according to claim 3, further comprising:
    a storage device configured to store parameters for calculation of the threshold value,
    wherein the touch recognition circuit is configured to read out the parameters from the storage device in accordance with the interconnection length to the target capacitor.

5. The touch panel controller according to claim 3, wherein:
    the touch recognition circuit includes a processor.

6. The touch panel controller according to claim 1, further comprising:
    a touch drive circuit configured to charge the target capacitor; and
    a detection circuit configured to detect electric charge discharged from the target capacitor, and to adjust detection sensitivity based on an interconnection length to the target capacitor.

7. The touch panel controller according to claim 1, further comprising:
    a detection circuit configured to detect electric charge from the target capacitor; and
    a resistor coupled in series in between the terminal and an input terminal of the detection circuit, wherein the resistor is configured to adjust a resistance value based on the interconnection length of the target capacitor.

8. The touch panel controller of claim 1, wherein:
    the circuit elements are disposed on a single semiconductor substrate.

9. The touch panel controller according to claim 8, further comprising:
    a display drive circuit configured to be coupled to a display panel configured to overlap the touch panel, the display drive circuit configured to drive and control the display panel, wherein the display drive circuit is disposed on the semiconductor substrate.

10. An input device comprising:
    a touch panel controller configured to be coupled to a plurality of sensor capacitors arranged on a touch panel through an interconnection, the touch panel controller comprising:

circuit elements configured to:
a terminal configured to connect to the interconnection; and circuit elements configured to:
detect capacitance values of the plurality of sensor capacitors by sequentially setting each of the plurality of sensor capacitors as a target capacitor and measuring electric charge of the target capacitor through the terminal; and
vary a detection characteristic corresponding to the target capacitor based on an interconnection length from the terminal to the target capacitor compensate for variation in interconnection resistances of the plurality of sensor capacitors.

11. The input device according to claim 10, wherein:
the circuit elements comprise a touch recognition circuit configured to detect touch or non-touch to the target capacitor based on a threshold value, where the threshold value is adjusted based on the interconnection length.

12. The input device according to claim 11, wherein the circuit elements comprise:
a touch drive circuit configured to charge the target capacitor;
a detection circuit configured to detect electric charge discharged from the target capacitor; and
an AD conversion circuit configured to convert an output of the detection circuit into a digital value corresponding to a capacitive value of the target capacitor,
wherein the touch recognition circuit is configured to detect touch coordinates based on a plurality of digital values output from the AD conversion circuit.

13. The input device according to claim 12, further comprising:
a storage device configured to store parameters for calculation of the threshold value,
wherein the touch recognition circuit is configured to read out the parameters from the storage device in accordance with the interconnection length to the target capacitor.

14. The input device according to claim 12, wherein:
the touch recognition circuit includes a processor.

15. The input device according to claim 10, further comprising:
a touch drive circuit configured to charge the target capacitor; and
a detection circuit configured to detect electric charge discharged from the target capacitor, and to adjust detection sensitivity based on an interconnection length to the target capacitor.

16. The input device according to claim 10, further comprising:
a detection circuit configured to detect electric charge from the target capacitor; and
a resistor coupled in series in between the terminal and an input terminal of the detection circuit, wherein the resistor is configured to adjust a resistance value based on the interconnection length of the target capacitor.

17. The input device of claim 10, wherein:
the circuit elements are disposed on a single semiconductor substrate.

18. The input device according to claim 17, further comprising:
a display drive circuit coupled to a display panel configured to overlap the touch panel and configured to drive and control the display panel, wherein the display drive circuit is disposed on the semiconductor substrate.

19. A method comprising:
detecting, capacitance values of a plurality of sensor capacitors arranged on a touch panel through an interconnection by sequentially setting each of the plurality of sensor capacitors as a target capacitor and measuring electric charge of the target capacitor through a terminal configured to connect to the interconnection ; and
varying a detection characteristic corresponding to the target capacitor based on an interconnection length from the terminal to the target capacitor to compensate for variation in interconnection resistances of the plurality of sensor capacitors.

20. The method of claim 19, further comprising:
detecting touch or non-touch to the target capacitor based on a threshold value, where the threshold value is adjusted based on the interconnection length.

* * * * *